United States Patent [19]
Lozano

[11] Patent Number: 5,798,953
[45] Date of Patent: *Aug. 25, 1998

[54] APPARATUS AND METHOD FOR DETERMINING A NUMBER OF DIGITS LEADING A PARTICULAR DIGIT

[75] Inventor: Leonel Lozano, Austin, Tex.

[73] Assignee: Advanced Micro Devices, Inc., Sunnyvale, Calif.

[*] Notice: The term of this patent shall not extend beyond the expiration date of Pat. No. 5,574,670.

[21] Appl. No.: 718,710

[22] Filed: Sep. 24, 1996

Related U.S. Application Data

[63] Continuation of Ser. No. 295,347, Aug. 24, 1994, Pat. No. 5,574,670.

[51] Int. Cl.⁶ .............................. G06F 7/00; G06F 15/00
[52] U.S. Cl. ........................... 364/715.1; 364/715.04
[58] Field of Search ........................... 364/715.1, 715.04, 364/715.09, 715.11, 748.1, 715.011

[56] References Cited

U.S. PATENT DOCUMENTS

| | | | |
|---|---|---|---|
| 3,678,259 | 7/1972 | Kyser | 364/715.1 |
| 4,161,784 | 7/1979 | Cushing et al. | 364/748.19 |
| 4,189,716 | 2/1980 | Krambeck | 341/63 |
| 4,631,696 | 12/1986 | Sakamoto | 364/715.03 |
| 4,789,956 | 12/1988 | Hildebrandt | 364/736.5 |

(List continued on next page.)

FOREIGN PATENT DOCUMENTS

94/27205  11/1994  WIPO.

OTHER PUBLICATIONS

IEEE Standard for Binary Floating–Point Arithmetic, ANSI/IEEE Std. 754–1985, ©1985, pp. 7–17.

R.M. Tomasulo, *An Efficient Algorithm for Exploiting Multiple Arithmetic Units*, Part 2, Regions of Computer Space, Section 3 Concurrency: Single–Processor System (IBM Journal; vol. 11, Jan. 1967), pp. 293–305.

R.M. Tomasulo, *An Efficient Algorithm for Exploiting Multiple Arithmetic Units*, IBM Journal of Research and Development, Jan. 1967, vol. 11, pp. 25–32.

Vojin G. Oklobdzija, *An Algorithmic and Novel Design of a Leading Zero Detector Circuit: Comparison with Logic Synthesis*, IEEE Transactions on Very Large Scale Intergration (VLSI) Systems, Mar. 2, 1994, pp. 124–128.

*Primary Examiner*—Paul P. Gordon
*Assistant Examiner*—Emmanuel L. Moise
*Attorney, Agent, or Firm*—Skjerven, Morrill, MacPherson, Franklin & Friel, L.L.P.; Kent B. Chambers

[57] ABSTRACT

When a data input signal having R plus X groups of M digits is received, the digits are segmented such that X different first counter-detectors receive M digits and a second counter-detector receives the R digits. The counter-detectors determine a number of most significant count digits leading a most significant non-count digit and detect the presence of a non-count digit. A decoder receives the outputs of the first counter-detectors and, responsive to a non-count digit detection in a most significant group of M digits having a non-count digit, communicates the corresponding count number to a concatenator. A third counter-detector determines and communicates a number of most significant groups of M digits having no non-count digits. An output of the third counter detector is concatenated with an output of the decoder where the decoder output is represented by Z digits where $M=N^Z$ (X, M, R, N, and Z are non-negative integers). The concatenation represents the number of leading count digits. If R is non-zero, the second counter-detector determines a number of most significant count digits leading a most significant non-count digit and detects the presence of a non-count digit in the R most significant bits. An adder then adds R to the concatenation. A multiplexer selects the number of leading count digits in the R bits if the R bits contain a non-count digit else the multiplexer selects the concatenation plus R.

20 Claims, 13 Drawing Sheets

U.S. PATENT DOCUMENTS

| | | | |
|---|---|---|---|
| 4,928,223 | 5/1990 | Dao et al. | 395/597 |
| 5,053,631 | 10/1991 | Perlman et al. | 364/748.14 |
| 5,058,048 | 10/1991 | Gupta et al. | 364/748.14 |
| 5,111,415 | 5/1992 | Shackleford | 364/715.04 |
| 5,128,888 | 7/1992 | Tamura et al. | 364/748.14 |
| 5,204,825 | 4/1993 | Ng | 364/715.04 |
| 5,241,490 | 8/1993 | Poon | 364/715.04 |
| 5,257,215 | 10/1993 | Poon | 364/745 |
| 5,317,527 | 5/1994 | Britton et al. | 364/715.04 |
| 5,481,686 | 1/1996 | Dockser | 395/375 |
| 5,499,352 | 3/1996 | Clift et al. | 395/412 |
| 5,574,928 | 11/1996 | White, et al. | 395/800 |
| 5,696,955 | 12/1997 | Goddard et al. | 395/563 |

KEY TO FIG. 4

| FIG. 4A | FIG. 4B |

KEY TO FIG. 8

| FIG. 8A | FIG. 8B |

APPARATUS AND METHOD FOR DETERMINING A NUMBER OF DIGITS LEADING A PARTICULAR DIGIT

This application is a continuation of application Ser. No. 08/295,347, filed Aug. 24, 1994, now U.S. Pat. No. 5,574,670.

BACKGROUND OF THE INVENTION

1. Field of the Invention

This invention relates to an apparatus and method for determining a number of digits leading a particular digit in a data input signal.

2. Description of the Related Art

An apparatus and method for determining a number of bits leading a particular bit ("leading bit indicator" when considering a binary digit apparatus) pertains to a device used to determine a number of particular count bits in a binary data signal that lead or precede a non-count bit. Each binary digit ("bit") has a value, either a one or a zero. If it is desirable to count leading bits having a value of zero, for example, then a count bit would have a value of zero and a non-count bit would have a value of one. A leading bit indicator, or leading zero indicator for the previous example, would provide an indication of the number of count bits, in a data signal containing multiple bits, that precede a non-count bit. Those count bits that lead a non-count bit in a data signal are the most significant bits. For example, each bit in a binary data signal has ones usually represented by positive voltage levels (e.g. +5 V) and/or zeros usually represented by a common ground voltage level (i.e. 0 V). Assuming a binary data signal contains 16 bits, a 16 bit binary Leading Zero Indicator would count the number of leading zeros (where zeros constitute a count bit) by determining the number of zeros that lead or precede the first one (where ones constitute a non-count bit) in the 16 bit data input signal. (Note: in the absence of a one, the number of leading zeros would equal the number of bits in the data input signal). In a numerical example, if a 16 bit binary Leading Zero Counter had a 16 bit binary data input signal such as 0000 0000 0011 0111$_2$, the Leading Zero Indicator would contain a 1010$_2$ output which represents the number of leading zeros.

Leading bit indicators are particularly useful when incorporated in floating point units. Floating point units perform floating point computations which play an important role in the realm of microprocessors. Leading zero bit counters have been particularly useful in assisting floating point units to meet ANSI/IEEE Std. 754–1985 ("IEEE Std.") for binary floating point arithmetic.

A floating point number consists of a significand, also known as a fraction or mantissa, and an exponent, which is usually (but not always) a power of 2. The exponent and significand may both vary in length depending on the range and precision desired. Signed numbers can be stored in either sign and magnitude form or by using a complement notation. (A floating point unit number may also consist of other specialty bits positioned before and/or after and/or between the significand and the exponent).

The IEEE Std. mandates representing the value of a floating point number in a normalized form i.e. as $(-1)^{sign}2^{exponent+bias}$(significand) where the bias is chosen so that exponent +bias will be a positive value. (Note: the IEEE Std. provides for a denormalized number which is a non-zero number containing leading zeros and whose exponent plus bias has a reserved value usually equal to zero). Therefore, to comply with IEEE Std. the significand and the exponent must be adjusted accordingly in order to eliminate leading zeros. Assuming that the floating point unit is designed to process binary numbers, after performing an arithmetic operation on two binary numbers the result often contains leading zeros. Unless the exponent has a minimum value, a result containing leading zeros fails to comply with the IEEE Std.

For example, if a 32 bit number has a 23 bit significand consisting of bits 0.00000010000110101110$_2$, an exponent consisting of 01001011$_2$, and a sign bit of 0$_2$, the significand would be in an unacceptable format because the exponent is greater than the minimum exponent and zeros lead the first one in the significand. In order to put the significand into an acceptable or normalized format, the number of leading zeros should be counted and subtracted from the exponent. The significand should also be shifted to the left a number of times equal to the number of leading zeros which will place the first 1 bit in the most significant bit place. After following this procedure, a number meeting the IEEE Std. is obtained. Using the above 32 bit number, the number of leading zeros equals 0111$_2$. Therefore, the significand is shifted to the left 0111$_2$ times, and 0111$_2$ is subtracted from the exponent. The example significand and exponent would now look like 1.0000110101011100000000$_2$ and 01000100$_2$ which meets the IEEE Std.

The model 29050 Microprocessor, available from Advanced Micro Devices of Sunnyvale, Calif., contains a 56 bit leading bit indicator. FIG. 1 illustrates a high level block diagram of the leading one bit indicator found in the AMD 29050. (Note: a leading one indicator may easily be converted to determine a number of leading zeros by inverting each of the data input signal bits prior to its reception by the leading one indicator). Referring to FIG. 1, the AMD 29050 56 bit counter receives a 56 bit number with the last bit, bit 0, being the least significant bit and the first bit, bit 55, being the most significant bit. The 8 bit counter logic 112 receives the most significant group of bits 48–55, 8 bit counter logic 110 receives the second most significant group of bits 40–47, 8 bit counter logic 108 receives the third most significant group of bits 40–47, 8 bit counter logic 108 receives the fourth most significant group of bits 32–39, 8 bit counter logic 106 receives the fifth most significant group of bits 24–21, 8 bit counter logic 104 receives the sixth most significant group of bits 16–23, 8 bit counter logic 102 receives the seventh most significant group of bits 8–15, and 8 bit counter logic 100 receives least significant group of bits 0–7. Each 8 bit counter logic provides two outputs. The first output is a 3 bit output representing the number of leading ones in the 8 bit data input signal of the 8 bit counter logic. The second output of the 8 bit counter logic is a 2 bit signal representing the presence of a zero in the least significant 4 bits and the presence of a zero in the most significant 4 bits.

The 56 bit counter logic 122 receives the output of 8 bit counter logic 100. The 16 bit counter logic 114 receives the outputs of 8 bit counter logic 102 and 104. The 56 bit counter logic 122 receives two outputs from 16 bit counter logic 114. The first output of 16 bit counter logic 114 is a 4 bit number representing the number of leading ones in the data input signal to 16 bit counter logic 114. The second output is a 2 bit number that represents the presence or the absence of a zero in bits 8–23. Sixteen bit counter logic 114 first determines the presence of a zero in the most significant 8 bits 16–23. If a zero is present, the circuit determines only the number of zeros in the most significant 8 bits. If the most significant 8 bits contained all ones, the output would correspond to the 8 ones in the most significant 8 bits plus the number of ones in the least significant 8 bits. The output is then received by the 56 bit counter logic 122.

Sixteen bit counter logic 116 functions similarly to 16 bit counter logic 114 except that 16 bit counter logic 116 operates on bits 24–39 and 16 bit counter logic 118 operates on bits 48–55. Sixteen bit counter logic 116 and 16 bit counter logic 118 have outputs that are received by 32 bit counter logic 120. Thirty-two bit counter logic 120 determines the number of ones in the two 16 bit counter logics 116 and 118. If the most significant 16 bits, bits 40–55, contain a zero, the output of 32 bit counter logic will represent the number of ones present in bits 40–55. If bits 40–55 contain all ones, the output of 32 bit counter logic 120 will reflect the number of ones present in bits 24–55. Thirty-two bit counter logic 120 has a second output indicating whether or not a zero is present in bits 40–55 and whether or not a zero is present in bits 24–39.

Fifty-six bit counter logic 122 contains the final output which represents the number of leading ones in the original 56 bit data input signal. Fifty-six bit counter logic 122 operates by detecting the presence of a zero in the most significant 32 bits. If a zero is detected, the number of ones received from 32 bit counter logic 120 are provided to an output. This result represents the correct number of leading ones in the original 56 bit data input signal. If the most significant 32 bits contain all ones, 56 bit counter logic 122 then analyzes the next 16 bits, bits 8–23, and detects the presence of a zero. If a zero is present, the output of 56 bit counter logic 122 represents the most significant 32 bits containing ones exclusively and the number of leading ones in the next 16 bits, bits 8–23. The 56 bit counter logic 122 subsequently analyzes the 8 bit counter logic 100 output only if the most significant 48 bits contained all ones. If the most significant 48 bits contained all ones, the output of 56 bit counter logic 122 would reflect the number of leading ones in the most significant 48 bits containing ones exclusively and the number of leading ones in the least significant 8 bits. Fifty-six bit counter logic 122 has a second output represents the presence of a zero anywhere in the original 56 bit data input signal.

A disadvantage of the discussed prior art is the complex implementation of multiple stages necessary to determine the number of leading count bits present in a data input signal. Further, complex implementation results in a slower device speed due to propagation delays from a larger number of logic stages.

SUMMARY OF THE INVENTION

These disadvantages and others are overcome in the present invention. Additionally, the present invention offers several advantages. One advantage is that the present invention is simpler to construct. The present invention also advantageously operates at higher operating speeds. The present invention in a first embodiment is a leading digit indicator for determining a number of leading count values in a data input signal. A leading digit indicator pertains to a device used to determine a number of particular count digits in a data signal that lead or precede a non-count digit. A count digit is a digit whose value it is desirable to count. A non-count digit is a digit whose value it is not desirable to count. Leading count digits are the most significant digits in a data input signal, having any number of digits, that precede (or are more significant than) the most significant non-count digit. The data input signal has X groups of M digits with each digit having N possible values. The N possible values may be count values and non-count values. The leading digit indicator includes a first input to receive a first data input signal. The first data input signal is indicative of a number of most significant groups of M digits leading a most significant non-count group. The first data input signal may be provided by a counter or counter-detector. The most significant non-count group is a most significant group of M bits to have a non-count digit, where a non-count digit is a digit with a non-count value. The leading digit indicator further includes a second input to receive a second data input signal. The second data input signal is indicative of a number of leading count digits in the first non-count group, where a count digit is a digit with a count value. The second data input signal may be provided by a counter or counter-detector. The count and non-count values may include a two values such as a zero and a one in a binary data signal or may include groups of values in a data input signal possessing a multiplicity of values. The leading digit indicator further includes a concatenator, coupled to the first and second inputs, to concatenate the first data input signal and the second data input signal to form a concatenation representing the number of leading count digits in the X groups of M digits in the data input signal. The second data input signal is represented by Z bits where $M=N^Z$ and X, M, N, and Z are non-negative integers.

In a second embodiment, the present invention is a leading digit indicator where the data input signal includes R most significant digits in addition to the X groups of M bits in the previous embodiment. The second embodiment includes the first embodiment and additionally includes a third input to receive a third data input signal, adder circuitry, and multiplexer circuitry. The third data input signal indicates the presence and location of a non-count digit in the R most significant digits. The third data input signal may be provided by a counter or counter-detector. The adder is coupled to the concatenator circuitry and adds R to the concatenation of the first embodiment to form a concatenation plus R. The adder circuitry further has an output to communicate the concatenation plus R. The multiplexer circuitry, coupled to the adder output to receive the concatenation plus R and the third data input signal, includes an output to communicate the concatenation plus R when the third input data signal indicates the absence of a non-count digit in the R most significant digits and to communicate the number of leading count digits in the R most significant digits when the third input signal indicates the presence and location of a non-count digit in the R most significant digits, wherein a non-count digit is a digit having a non-count value.

It will also be appreciated that methods for determining a number of leading count digits in a data input signal are also disclosed.

DESCRIPTION OF THE PREFERRED EMBODIMENTS

Figure 10:
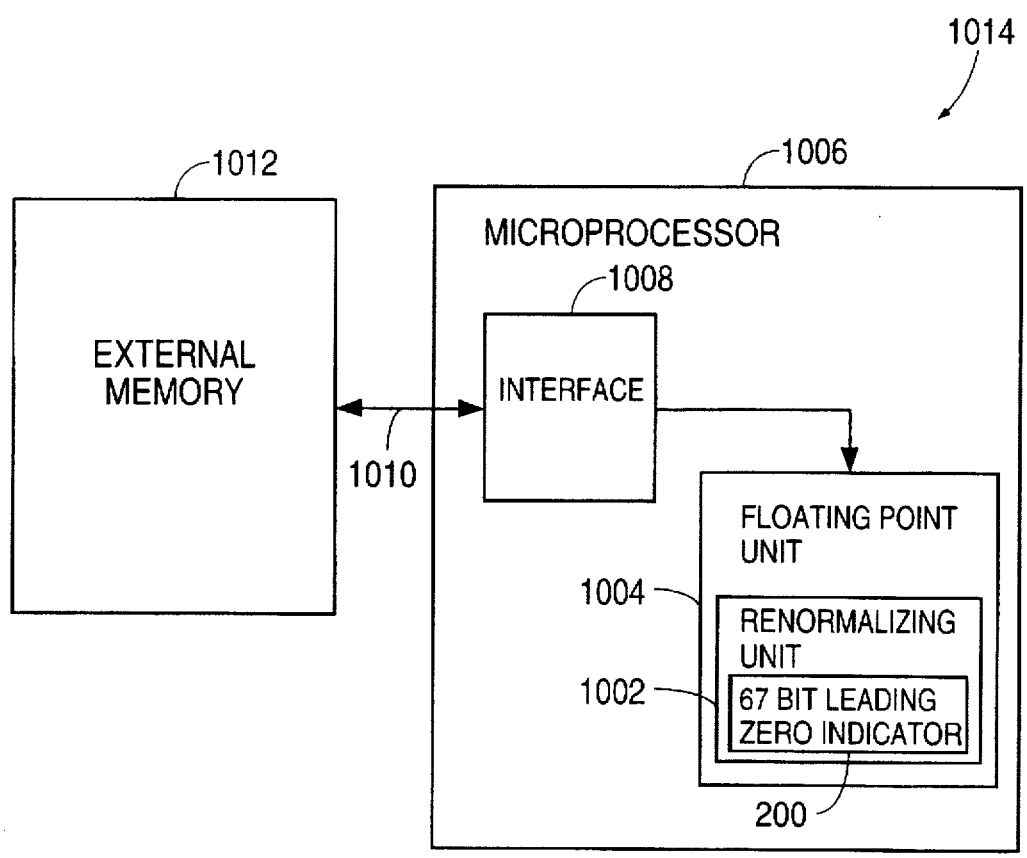
FIG. 10 illustrates a block diagram of a computer system.

Referring to FIG. 10, the 67 bit Leading Zero Indicator 200 may be used, for example, in a renormalizing unit 1002 within a floating point unit 1004 which is part of a computer system 1014. Typically, a renormalizing unit is part of a floating point unit. Various floating point units are well known in the art, and include the Floating Point Unit in U.S. Pat. No. 5,058,048, the disclosure of which is hereby incorporated by reference. Furthermore, the floating point unit 1004 may be used, for example, separately from or, as shown, integrated with a Microprocessor 1006. One suitable integration of a floating point unit with a superscalar microprocessor is disclosed in the "High Performance Superscalar Microprocessor," U.S. application Ser. No. 08/146,382 (attorney's docket number M-2518 U.S.) by D. B. Witt and W. Johnson, filed on Oct. 29, 1993, the disclosure of which is hereby incorporated by reference. The interface 1008 of microprocessor 1006 is connected via bus 1010 to external memory 1012. The computer system 1014 typically includes such other components as a keyboard and display (not shown).

ENUMERATOR CIRCUIT 227—STRUCTURE

Figure 1:
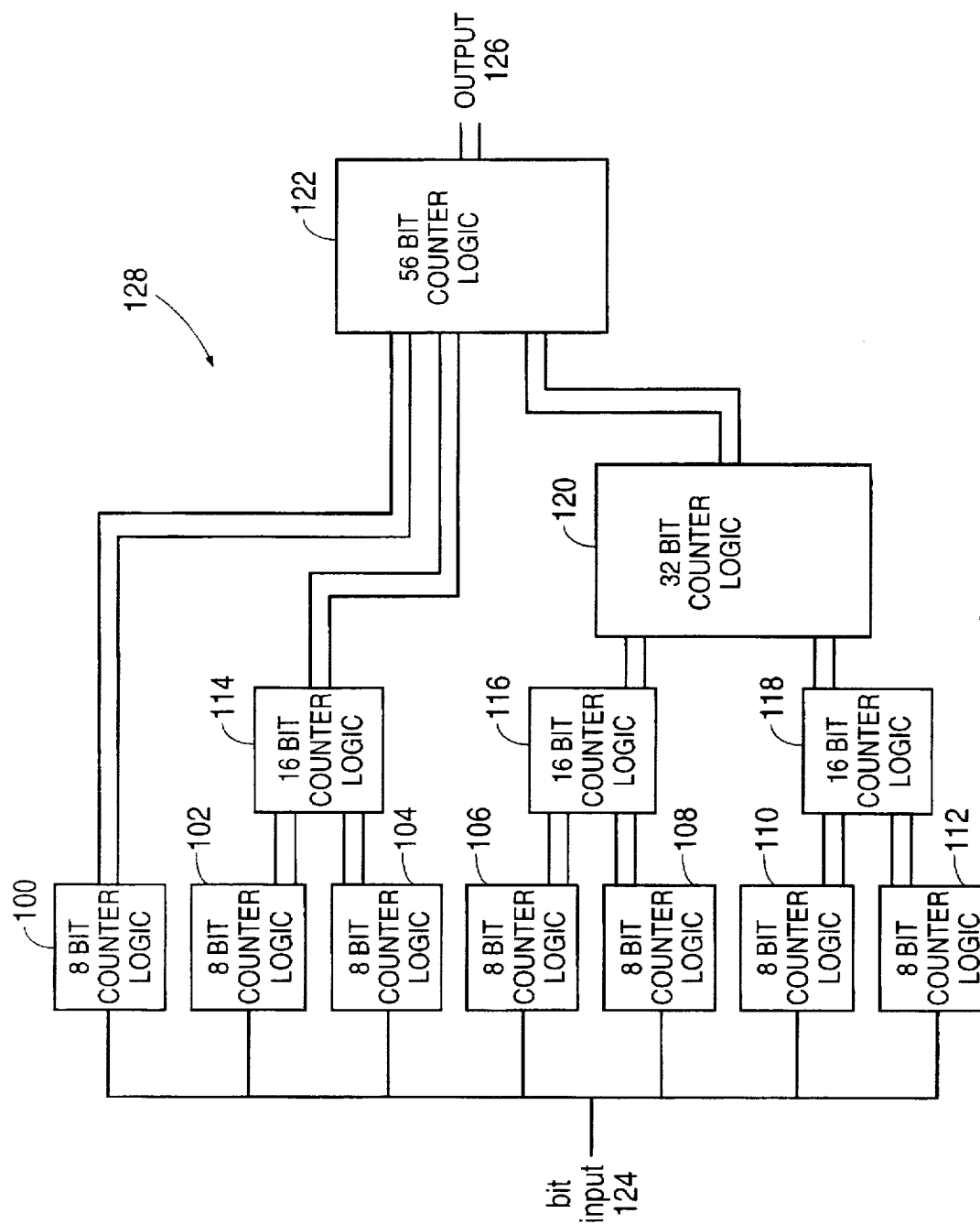
FIG. 1 illustrates a block diagram of the prior art Advanced Micro Devices 29050 Leading One Indicator.
Figure 2A:
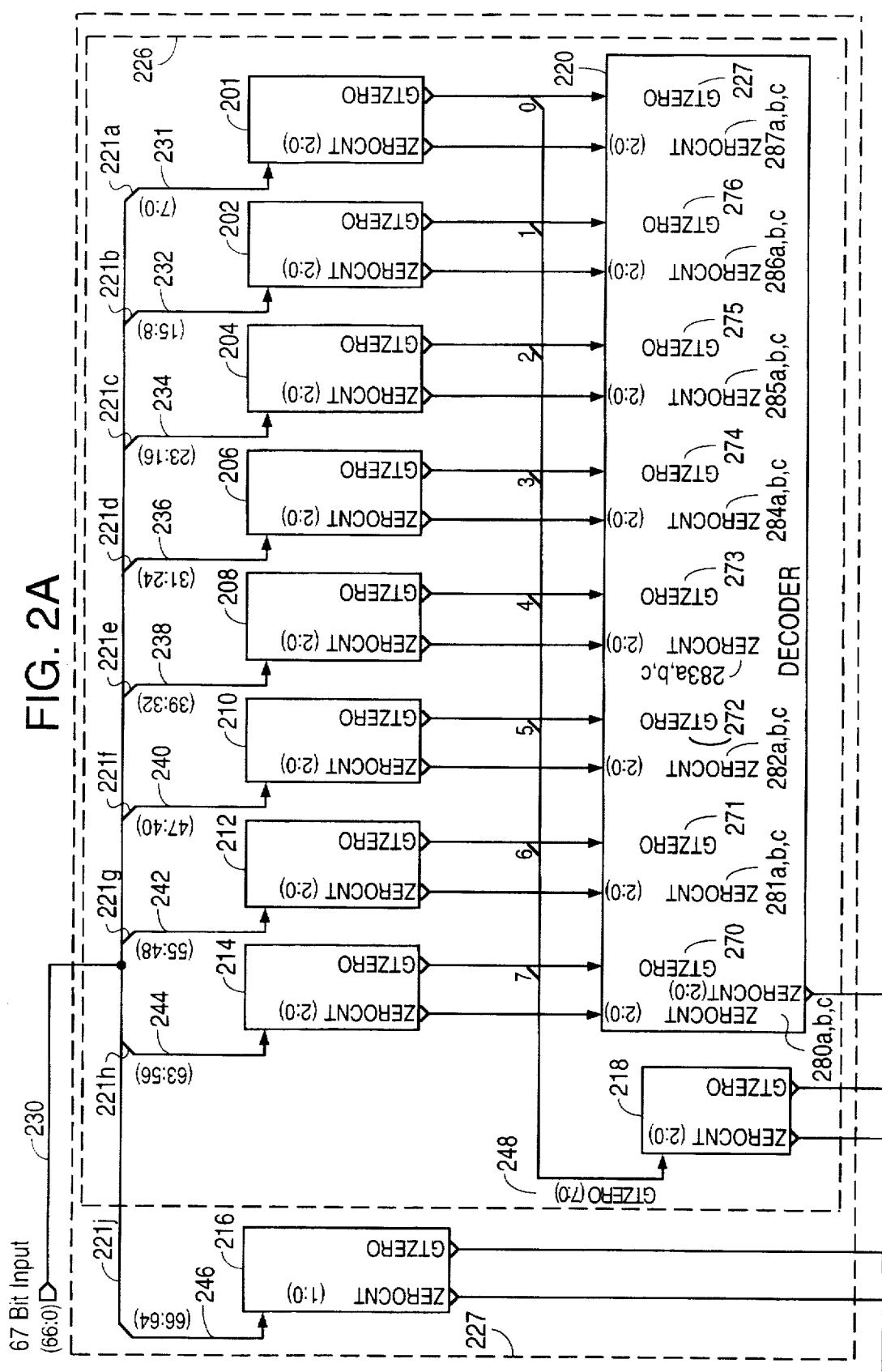
FIG. 2 illustrates a block diagram of a 67 bit Leading Zero Indicator.
Figure 2B:
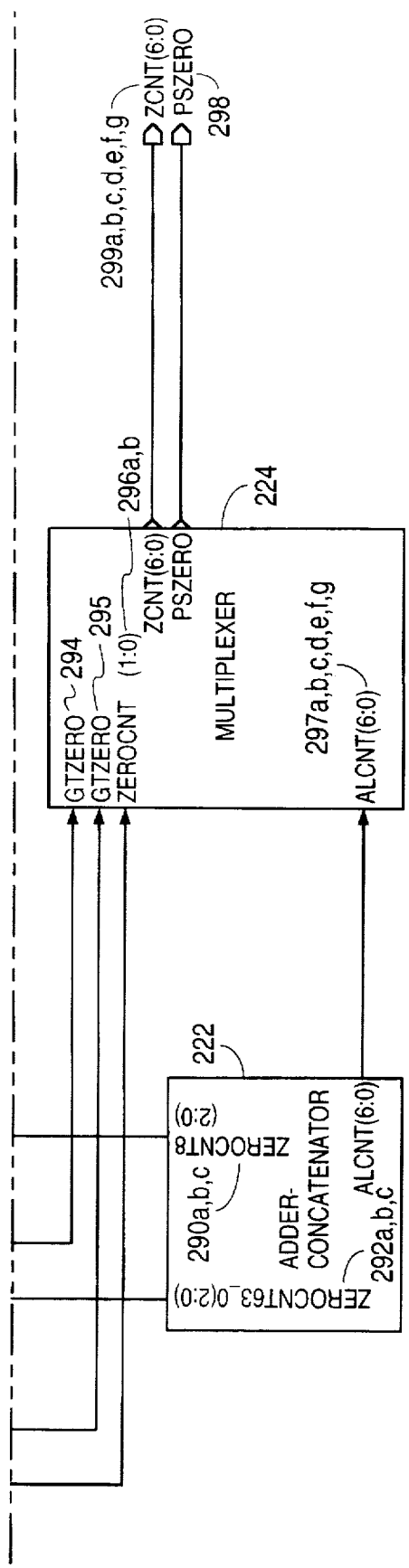
Figure 2B:
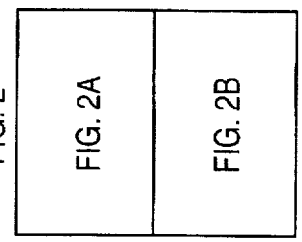

FIG. 2 illustrates a block diagram of a 67 bit Leading Zero Indicator. The 67 bit Leading Zero Indicator 200 incorporates enumerator circuit 227, ADDER-CONCATENATOR 222 and MULTIPLEXER 224. Enumerator circuit 227 includes counter circuit 226 and 4 bit COUNTER-DETECTOR 216. Counter circuit 5 226 contains nine 8 bit COUNTER-DETECTORS 201–214 and 218 and DECODER 220. The 67 bit Leading Zero Indicator receives a binary data input signal obtained from floating point data stored in the external memory 1012 of FIG. 10. Each bit of the binary data input signal possesses one of two values. Enumerator circuit 227 has individual inputs for receiving each bit of a binary data input signal in parallel, although it will be appreciated that the circuit could easily be modified to receive each bit serially. The two values may be denoted as zeros and ones with a zero representing a reference voltage level, e.g. 0 Volts, and a one representing a different voltage level, e.g. +5 Volts (although other voltage levels such as +3 Volts may be used). A binary leading zero indicator determines the number of leading zeros, i.e. the number of zeros in the most significant positions of the data input signal that precede a one, and if a one is not present in the data input signal, the number of zeros in the data input signal. In a leading zero indicator, a zero symbolizes a "count bit" and a one symbolizes a "non-count bit." Where a "count bit" denotes a value that is to be counted by a leading bit indicator, and a "non-count bit" denotes a value that is not to be counted by a leading bit indicator.

ENUMERATOR CIRCUIT 227—OPERATION

In operation, enumerator circuit 227 receives a 67 bit data input signal 230 in parallel and segments the 67 bit data input signal 230, by routing data signal input lines 221a–221j to the counter detectors 201–216, respectively, into a most significant group of 3 bits and 8 groups of 8 bits. Data signal input lines 221a–221h each consist of 8 separate conductors, and data signal line 221j consists of 3 separate conductors. The 4-bit COUNTER-DETECTOR 216 and counter circuit 226 receive portions of the segmented 67 bit data input signal 230. The 4 bit COUNTER-DETECTOR 216 receives the most significant group of bits (66:64) 246. 8 bit COUNTER-DETECTOR 214 receives the second most significant group of bits (63:56) 244. 8 bit COUNTER-DETECTOR 212 receives the third most significant group of bits (55:48) 242. 8 bit COUNTER-DETECTOR 210 receives the fourth most significant group of bits (47:40) 240. 8 bit COUNTER-DETECTOR 208 receives the fifth most significant group of bits (39:32) 238. 8 bit COUNTER-DETECTOR 206 receives the sixth most significant group of bits (31:24) 236. 8 bit COUNTER-DETECTOR 204 receives the seventh most significant group of bits (23:16) 234. 8 bit COUNTER-DETECTOR 201 receives the eighth most significant group of bits (15:8) 232. 8 bit COUNTER-DETECTOR 201 receives the least significant group of bits (7:0) 231. (The notation "(X:Y)" represents bits X through Y with X being the most significant bit of bits X through Y e.g. (15:8) indicates an 8 bit number containing bits 15 through 8 with bit 15 being the most significant bit of bits 15 through 8.) The 67 bit data input signal 230 was purposefully segmented into the most significant group of 3 bits and a least significant group of 64 bits. The least significant group of 64 bits was further segmented into 8 groups of 8 bits. Each 8 bit group is received by an 8 bit COUNTER-DETECTOR 201–214 which provides a 3 bit counter output signal and a one bit detector output signal which, when taken as a whole, indicate the number of leading zeros in the 8 bit data input signal. The number of data input signal bits to each COUNTER-DETECTOR is directly related to the number of possible values in the data input signal and the number of 8 bit COUNTER-DETECTOR counter output signal bits. The relationship can be stated mathematically as the number of data input signal bits received by each COUNTER-DETECTOR equals the number of possible values for each bit raised to a power equal to the number of counter output signal bits. Stated another the logarithm of the number of data input signal bits equals the logarithm of the number of values multiplied by the number of counter output signal bits required. With an 8 bit data input signal received by each COUNTER-DETECTOR and two possible bit values, zero and one, the number of data output signal bits in an 8 bit COUNTER-DETECTOR used to indicate the number of leading count bits in each respective 8 bit COUNTER-DETECTOR is (log 8)/(log 2)=3 or $8=2^3$ e.g. a 16 bit data input signal has four counter data outputs in a 16 bit COUNTER-DETECTOR (i.e. (log 16)/(log 2)=4) and a 9 digit data input signal with each digit possessing three possible values, e.g. zero, one, or two, has two counter data outputs in a 9 bit COUNTER-DETECTOR (i.e. (log 9)/(log 3)=2). Note that "digit" is used to represent a single place in a data input signal with each digit capable of having any of a desired number of values such as zero, one, two, three, four, and so forth, with zeros and ones being used in a binary digit system.

8 BIT COUNTER-DETECTOR 300—STRUCTURE

Figure 3:
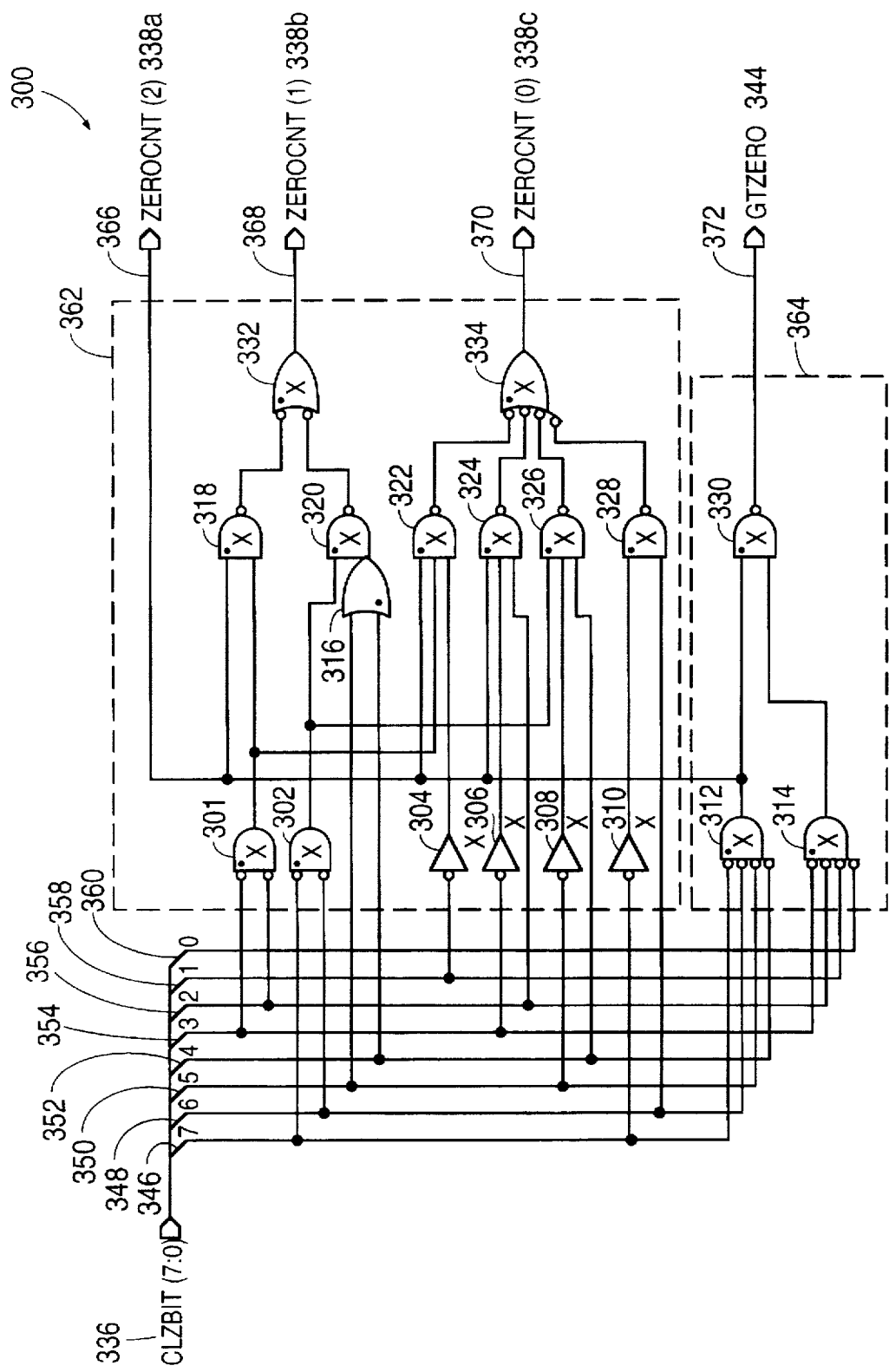
FIG. 3 illustrates a schematic diagram of an 8 bit COUNTER-DETECTOR employed by the 67 bit Leading Zero Indicator.

FIG. 3 illustrates the schematic of 8 bit COUNTER-DETECTOR 300 which schematically represents all of the 8 bit COUNTER-DETECTORS 201–214 and 218. The circuits illustrated in FIG. 3 as well as those in FIGS. 2 and FIGS. 4–9 are fabricated in complementary metal oxide semiconductor. One suitable implementation of 8 bit COUNTER-DETECTOR 300 uses an input with data signal input lines 346–360, counter circuitry 362, and detector circuitry 364. Note that 8 bit COUNTER-DETECTOR 300 may be considered as a separate counter 362 combined with a separate detector 364. The counter circuitry 362 uses NOR gates 301 and 302, INVERTERS 304–310, OR gate 316, NAND gates 318–328, outputs 366–370, and NAND gates 332–334 connected as shown in FIG. 3 to provide a 3 bit counter output signal, ZEROCNT (2) 338a, ZEROCNT (1) 338b, and ZEROCNT (0) 338c, which indicates the number of leading zeros in the 8 bit data input signal 336. The detector circuitry 364 uses NOR gates 312 and 314, output 372, and NAND gate 330 connected as shown in FIG. 3 to detect the presence of a one in the 8 bit data input signal 336 and provide a single bit output GTZERO 344 indicating the presence and absence of a detected one.

8 BIT COUNTER-DETECTOR 300— OPERATION

In operation, an 8 bit COUNTER-DETECTOR 300 determines the number of leading zeros in its respective 8 bit data input signal. Eight bit COUNTER-DETECTOR 300 receives an 8 bit data input signal 336 with each bit received and conducted sequentially on an input with data signal input lines 346–360 with input line 346 receiving the most significant bit. (Note: "sequentially" in the description of the preferred embodiments connotes location and does not connote a reference to time). Input lines 346–360 may collectively represent each of the data signal input lines 221a–221h. The 8 bit COUNTER-DETECTOR 300 has a 3 bit counter output signal, ZEROCNT (2) 338a, ZEROCNT (1) 338b, and ZEROCNT (0) 338c, representing the number of leading zeros in its 8 bit data input signal 336 when at least one of the data signal inputs 346–360 conducts a one. By ascertaining the number of leading zeros, the location of the most significant one is determined. The 3 bit counter output signal is conducted by an output with output signal lines 366–370. ZEROCNT (2) 338a represents the most significant bit, ZEROCNT (1) 338b represents the next most significant bit and ZEROCNT (0) 338c represents the least significant bit of the 3 bit output of 8 bit COUNTER-DETECTOR 300. The 8 bit COUNTER-DETECTOR 300 also contains a single bit detector output signal, GTZERO 344, which represents the presence of a one in the 8 bit data input signal when a one is present and the absence of a one in the 8 bit data input signal when a one is absent. The single bit detector output signal is conducted by output 372. If GTZERO 344 equals one (first state), one of the 8 bits received by the 8 bit COUNTER-DETECTOR 300 equals one. If GTZERO 344 equals zero (second state), all 8 bits of the data input signal are zeros. The 3 bit counter output signal and the one bit detector output signal indicate the number of zeros in the 8 bit data input signal.

DECODER 220—STRUCTURE

Figure 4A:
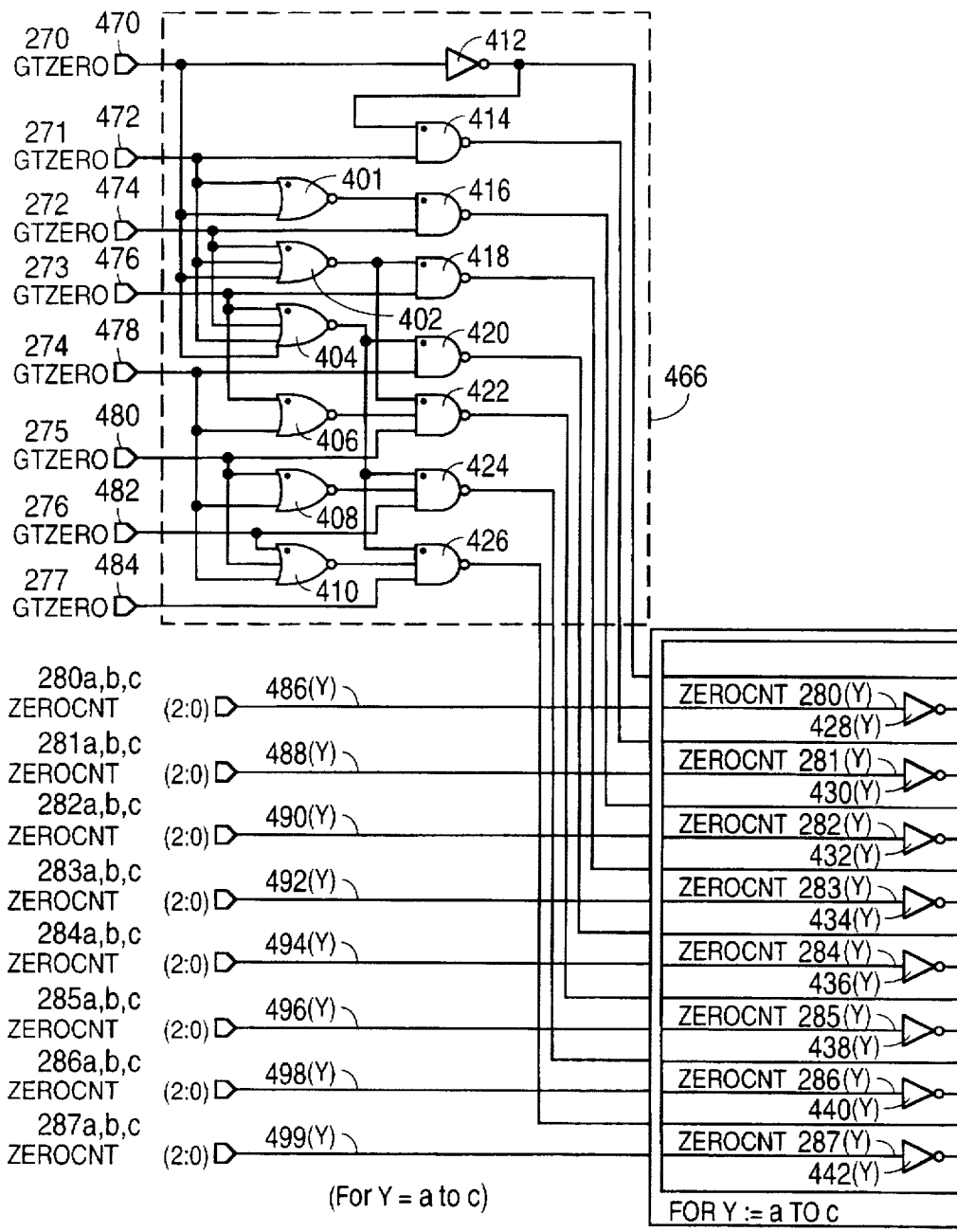
FIG. 4 illustrates a schematic diagram of a DECODER employed by the 67 bit Leading Zero Indicator.
Figure 4B:
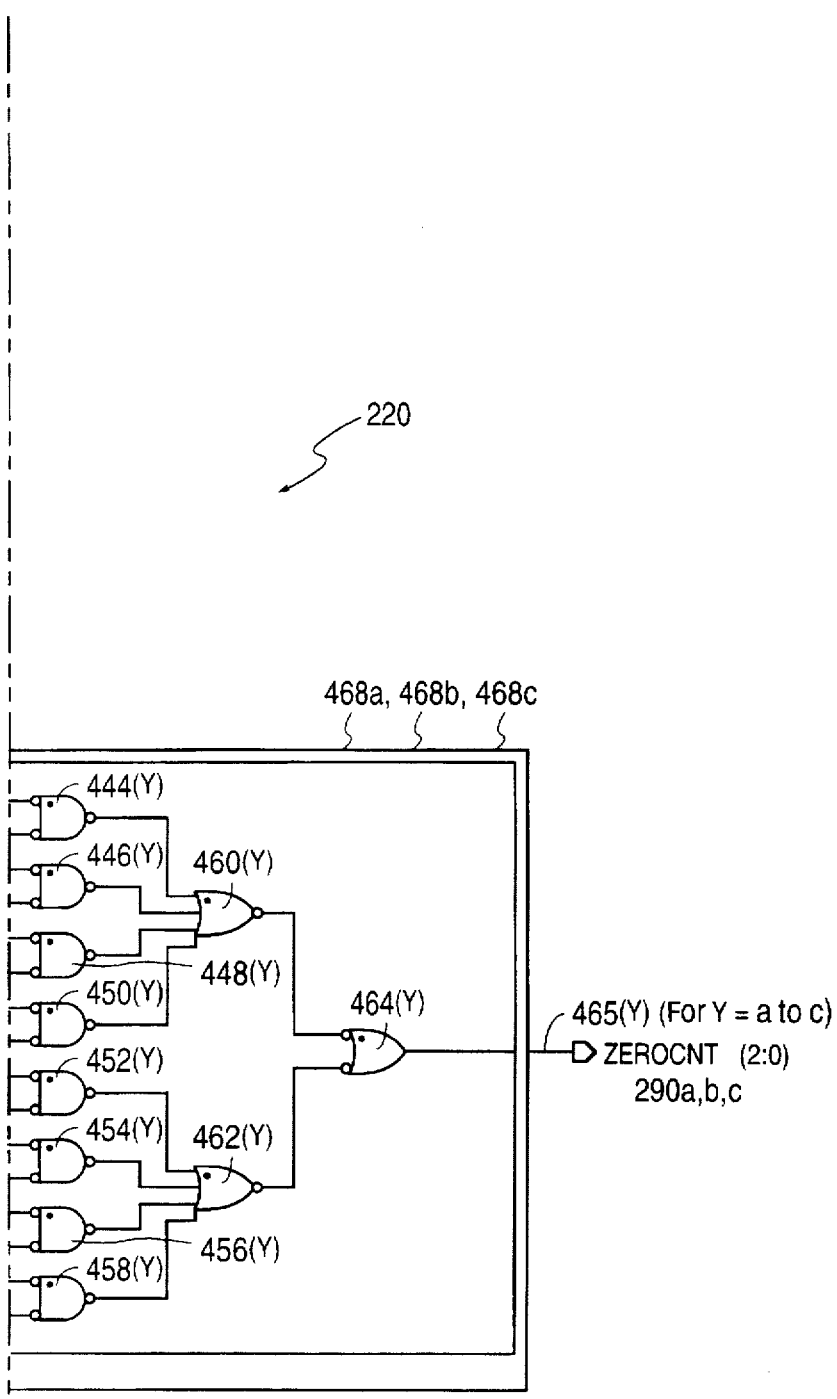

FIG. 4 illustrates a schematic diagram of DECODER 220. The DECODER 220 is connected to COUNTER-DETECTORS 201–214. One suitable implementation of DECODER 220 connects NOR gates 401–410, INVERTER 412, and NAND gates 414–426 to form circuit 466 as shown in FIG. 4. Circuit 466 is connected to an input with data signal input lines 470–484. DECODER 220 is further implemented by connecting identical circuits 468a, 468b, and 468c to circuit 466 and data inputs 486(Y)–499(Y).

In FIG. 4, circuits 468a, 468b, and 468c are represented schematically by a single circuit implemented by connecting INVERTERS 428(Y)–442(Y), NOR gates 444(Y)–458(Y), NOR gates 460(Y) and 462(Y), and NAND gate 464(Y) as shown in FIG. 4. Note the legend "FOR Y=a to c" in the boxes surrounding circuits 468a, 468b, and 468c. The legend denotes that when "Y" is substituted with "a", circuit 468a is obtained, when "Y" is substituted with "b", circuit 468b is obtained, and when "Y" is substituted with "c", circuit 468c is obtained (note: the "(2:0)" has been omitted from the ZEROCNT 280(Y)–287(Y) symbology within the boxes surrounding circuits 468a, 468b, and 468c).

DECODER 220—OPERATION

In operation, circuit 466 receives input signals GTZERO 270–277 conducted by data signal input lines 470–484. (Note: For clarity, elements present in multiple figures retain the same identifying numerals throughout all figures). Circuit 466 provides an 8 bit output with a single bit being a zero corresponding to the GTZERO output signal of the most significant of the 8 bit COUNTER-DETECTORS 201–214 to contain a one in its respective 8 bit data signal input with the other seven output bits of circuit 466 being ones. The most significant of the 8 bit COUNTER-DETECTORS 201–214 to contain a one in its respective 8 bit data input signal may be referred to as a "non-count group" due to the presence of a non-count value in its respective 8 bit data input signal.

In operation circuits 468a, 468b, and 468c receive data signals from circuit 466 and data input signals ZEROCNT (2:0) 280a,b,c–287a,b,c. Data input signals ZEROCNT (2:0) 280a,b,c287a,b,c are conducted by inputs 486(Y)–499 (Y). Circuit 468a receives ZEROCNT (2) 280a–287a, the most significant bits of ZEROCNT (2:0) 280a,b,c–287a,b,c, respectively. (The symbology "ZEROCNT (2:0) 280a,b,c" conveniently and concisely symbolizes ZEROCNT (2) 280a, ZEROCNT (1) 280b, and ZEROCNT (0) 280c. ZEROCNT (2) 280a symbolizes bit 2, the most significant bit of ZEROCNT (2:0) 280a,b,c. ZEROCNT (1) 280b symbolizes bit 1, the next most significant bit of ZEROCNT (2:0) 280a,b,c. ZEROCNT (0) 280a symbolizes bit 0, the least significant bit of ZEROCNT (2:0) 280a,b,c). Circuit 468b receives ZEROCNT (1) 280b–287b, the next most significant bits of ZEROCNT (2:0) 280a,b,c–287a,b,c, respectively. Circuit 468c receives ZEROCNT (0) 280a,b, c–287a,b,c, the least significant bits of ZEROCNT (2:0) 280a,b,c–287a,b,c, respectively. Circuits 468a, 468b, and 468c each receive identical data from circuit 466. Circuits 468a, 468b, and 468c provide the 3 bit data output signal ZEROCNT (2:0) 290 a,b,c, respectively. Circuits 468a, 468b, and 468c receive the outputs of circuit 466 and ZEROCNT (2) 280a–287a, ZEROCNT (1) 280b–287b, and ZEROCNT (0) 280c–287c, respectively, from 8 bit COUNTER-DETECTORs 201–214 as inputs. The bit of circuit 466 equaling zero enables circuits 468a, 468b, and 468c to communicate the ZEROCNT (2:0), corresponding to the NAND gate connected to the single zero output of circuit 466, to the output data signal lines 465(Y) which conducts data signal output ZEROCNT (2:0) 290a,b,c. If GTZERO 270–277 all equal zero corresponding to 67 bit data input signal containing all zeros, i.e. 67 leading zeros, then ZEROCNT (2:0) 290a,b,c, is 000$_2$.

8 BIT COUNTER-DETECTOR 218— OPERATION

In operation, the second outputs, GTZERO 270–277, of the 8 bit COUNTER-DETECTORS 201–214 are additionally connected to 8 bit COUNTER-DETECTOR 218 and provide an 8 bit data input signal to 8 bit COUNTER-DETECTOR 218. The schematic diagram FIG. 3 which illustrates 8 bit COUNTER-DETECTORS 201–214 also illustrates 8 bit COUNTER-DETECTOR 218. Three bit counter output signal ZEROCNT (2:0) 292a,b,c represents the number of leading zeros in the 8 bit data input signal of 8 bit COUNTER-DETECTOR 218 if a one is present in the data input signal. One bit detector output signal GTZERO 294 represents the presence or absence of a one in the 8 bit data input signal. As with 8 bit COUNTER-DETECTOR 300, the 3 bit counter output signal and the one bit detector output signal indicate the number of zeros in the 8 bit data input signal regardless of the presence of a one in the 8 bit data input signal. The 8 bit COUNTER-DETECTORS 218 could be easily modified individually or in any combination to provide a 4 bit counter output signal representing the number of leading zeros in the 8 bit data input signal regardless of the presence of a one in the 8 bit data input signal. For example, in FIG. 9, if inverter 901 and circuits 910b, 910c, and 910d are appropriately connected to GTZERO 344, ZEROCNT (2) 338a, ZEROCNT (1) 338b, and ZEROCNT (0) 338c, a 4 bit counter output signal capable of representing the number of leading zeros in an 8 bit data input signal containing all zeros will be provided in conventional binary format i.e. with bit n representing $2^n$ in base 10.

Significantly, each increment from $001_2$ to $111_2$ of ZEROCNT (2:0) 292a,b,c, represents an entire group of 8 zeros from each of the most significant of 8 bit COUNTER-DETECTORS in FIG. 2 possessing all zeros in their data input signal bits preceding the most significant 8 bit COUNTER-DETECTOR in FIG. 2 possessing a one in its data input signal. The most significant groups of bits having an absence of non-count values that precede the most significant group of bits having a non-count value ("non-count" group) may be referred to as the "count group" or the number of most significant groups of 8 bits leading a most significant non-count group. For example, in FIG. 2 assume 8 bit data input signals 238–244 contain all zeros and 8 bit data input signals 231–236 contain all ones. ZEROCNT (2:0) 292a, would equal $100_2$ or $4_{10}$ which represents the number of most significant count groups.

ADDER-CONCATENATOR 222—STRUCTURE

Figure 5:
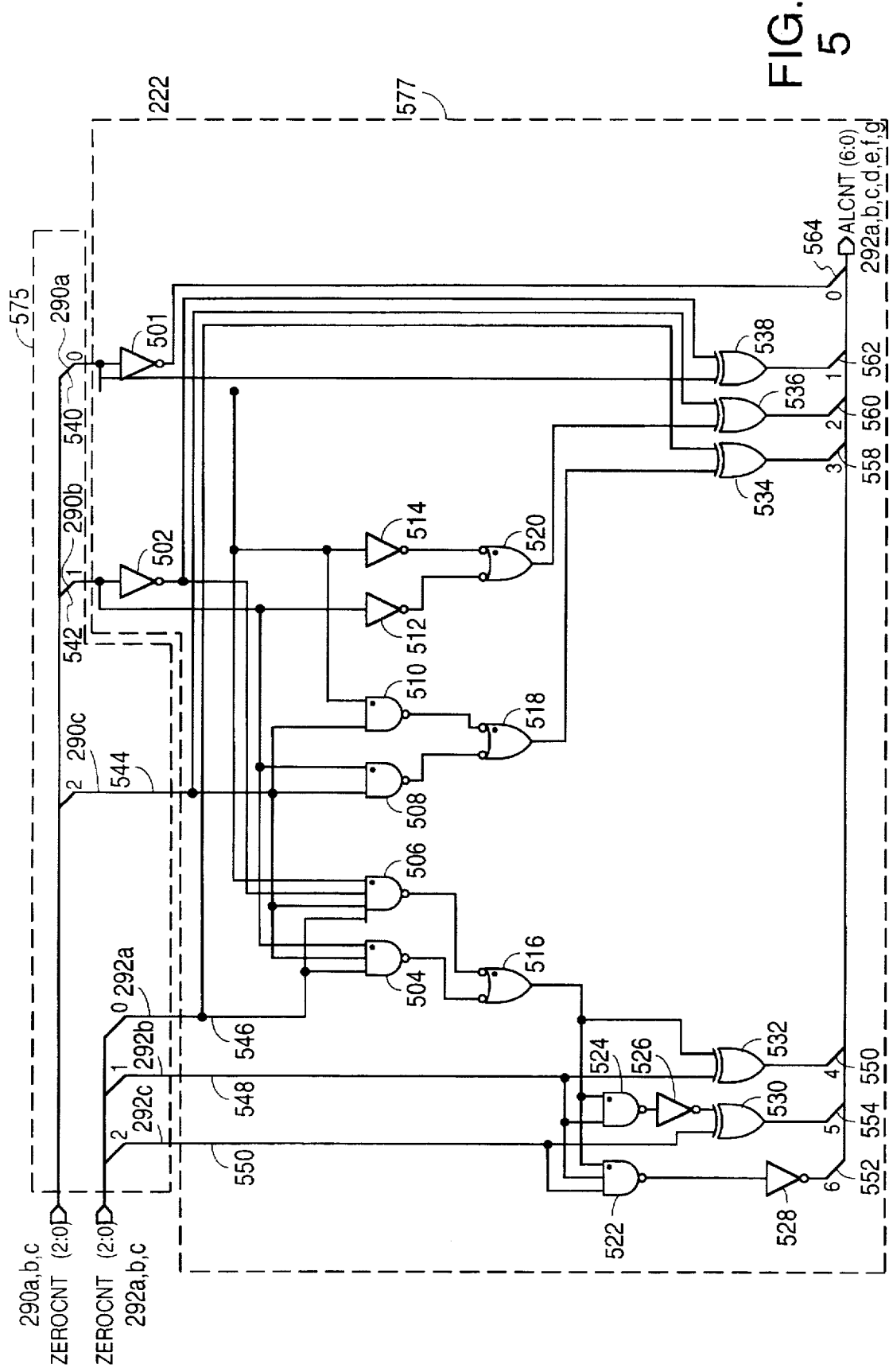
FIG. 5 illustrates a schematic diagram of an ADDER-CONCATENATOR unit employed by the 67 bit Leading Zero Indicator.

FIG. 5 illustrates a schematic diagram of ADDER-CONCATENATOR 222. ADDER-CONCATENATOR 222 is connected to 8 bit COUNTER-DETECTOR 218 and DECODER 220. As shown in FIG. 5, one suitable implementation of ADDER-CONCATENATOR 222 appropriately connects an input with data input signal lines 540–550, an output with data output signal lines 552–564, INVERTERS 501 and 502, NAND gates 504–510, INVERTERS 512–514, NAND gates 516–520, NAND gates 522 and 524, INVERTER 526 and 528, and EXCLUSIVE OR gates 530–538 to obtain adder-concatenator circuitry. Adder-concatenator 222 may be divided into concatenator circuitry 575 and adder circuitry 577.

ADDER-CONCATENATOR 222—OPERATION

In operation, ADDER-CONCATENATOR 222 performs the function of concatenating ZEROCNT (2:0) 290a,b,c to ZEROCNT (2:0) 292a,b,c with concatenator circuitry 575 and adding $11_2$ to the concatenation to obtain ADDER-CONCATENATOR's 222 seven bit data output signal ALCNT (6:0) 297a,b,c,d,e,f,g with adder circuitry 577. ADDER-CONCATENATOR 222 receives the data output signals of 8 bit DECODER 220 and COUNTER-DETECTOR 218, ZEROCNT 290a,b,c and ZEROCNT 292a,b,c, respectively. An input with data input signal lines 540–544 and 546–550 conducts data output signals ZEROCNT 290a,b,c and ZEROCNT 292a,b,c, respectively. Concatenator circuitry 575 concatenates data output signals ZEROCNT (2:0) 292a,b,c and ZEROCNT (2:0) 290a,b,c by taking the two sets of three signal lines conducting data output signals ZEROCNT (2:0) 292a,b,c and ZEROCNT (2:0) 290a,b,c and combining them into one group of six signal lines 540–550. Data input signal line 550 conducts the most significant bit of ZEROCNT (2:0) 292a,b,c, ZEROCNT (2) 292a. Data input signal line 544 conducts the most significant bit of data input signal ZEROCNT (2:0) 290a,b,c, ZEROCNT (2) 290a. An output with data output signal lines 552–564 conducts data output signal ALCNT (6:0) 297a,b,c,d,e,f,g with data output signal line 552 conducting the most significant bit. The concatenation of ZEROCNT (2:0) 290a,b,c to ZEROCNT (2:0) 292a,b,c forms a 6 bit number that represents the number of leading zeros in the least significant 64 bits of the 67 bit data input signal 230 when a single one bit is present in the least significant 64 bits. (Note: if 8 bit COUNTER-DETECTOR 218 is modified as previously mentioned to provide a 4 bit counter output signal, ADDER-CONCATENATOR 222 could be modified to concatenate the 4 bit counter output signal of 8 bit COUNTER-DETECTOR 218 with the output of DECODER 220 and adding $11_2$ to the concatenation thus providing a 7 bit output representing the number of leading zeros in the 67 bits when the 3 most significant bits 246 contain all zeros regardless of the presence of a one in the least significant 64 bits).

As previously mentioned, every increment of 8 bit COUNTER-DETECTOR 218 represents a group of 8 zeros. Therefore, if ZEROCNT (2:0) 292a,b,c is initially placed in the three most significant positions of a 6 bit data signal (such as the one conducted by concatenator circuitry's 575 data input signal lines 540–550), the most significant 3 bits of the 6 bit data output signal will represent the number of most significant zeros in the 64 bit data input signal of counter circuit 226 preceding the most significant first group of eight bits from inputs 231–244 to contain a one. When the least significant 3 bits of the 6 bit data output signal represent the output of DECODER 220, the 6 bit data output signal represents the number of leading zeros in the 64 bit data input signal of counter circuit 226. ADDER-CONCATENATOR 222 incorporates this principle by concatenating ZEROCNT (2:0) 290a,b,c with ZEROCNT (2:0) 292a,b,c to form a 6 bit number. However, recognizing the possibility that the 3 most significant bits 246 of 67 bit data input signal 230 might contain all zeros, $11_2$ is added to the 6 bit concatenation. Therefore, if the 3 most significant bits 246 of 67 bit data input signal 230 are all zeros, the output of ADDER-CONCATENATOR 222 represents the number of leading zeros in the 67 bit data input signal 230 when a one is present in the input signal.

4 BIT COUNTER-DETECTOR 216—STRUCTURE

Figure 6:
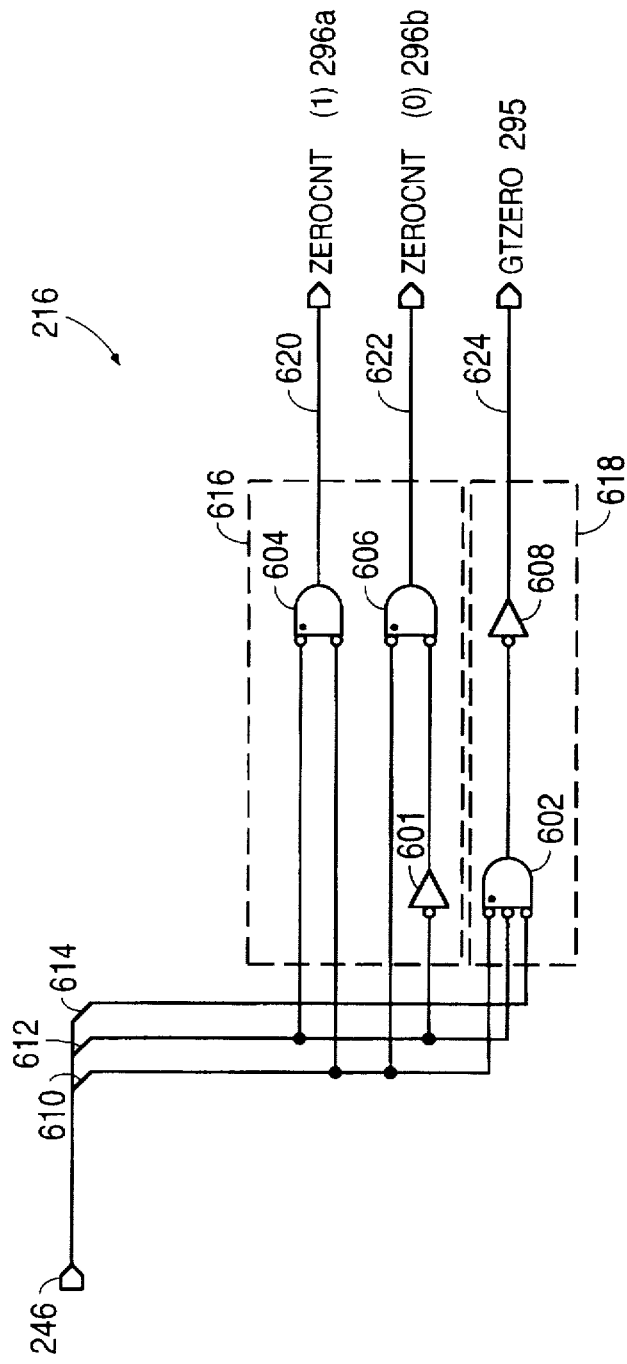
FIG. 6 illustrates a schematic diagram of a 4 bit COUNTER-DETECTOR employed by the 67 bit Leading Zero Indicator.

FIG. 6 illustrates one embodiment of the 4 bit COUNTER-DETECTOR 216. Four bit COUNTER-DETECTOR 216 receives a 3 bit data input signal 246 with each bit present sequentially on an input with data input signal lines 610–614 with input signal line 610 receiving the most significant bit. As shown in FIG. 2, 4 bit COUNTER-DETECTOR 216 receives the 3 most significant bits of 67 bit data input signal 230. Note that 4 bit COUNTER-DETECTOR 216 may be considered as a separate counter 616 combined with a separate detector 618. Four bit COUNTER-DETECTOR 216 employs counter circuitry 616 and detector circuitry 618. Counter circuitry may be implemented by appropriately connecting INVERTER 601 and NOR gates 604–606, outputs 620–624, and INVERTER 608 as shown in FIG. 6 to count the number of leading count values, zeros, conducted by data input signal lines 610–614. Detector 618 circuitry may be implemented by appropriately connecting NOR gate and INVERTER 608 as shown in FIG. 6 to detect the presence and absence of a non-count value, one, conducted by any of the data input signal lines 610–614. The 4 bit COUNTER-DETECTOR 216 has a two bit counter output signal, ZEROCNT (1) 296a, the most significant bit, and ZEROCNT (0) 296b the least significant bit, and a single bit detector output signal, GTZERO 295.

4 BIT COUNTER-DETECTOR 216—OPERATION

In operation, 4 bit COUNTER-DETECTOR 216 determines the number of leading zeros in its 3 bit data input signal 246. Data input signal lines 610–614 conduct 3 bit data input signal 246 with data input signal line 610 conducting the most significant bit. The 4 bit COUNTER-DETECTOR 216 provides a 2 bit data output signal, ZEROCNT (1) 296a and ZEROCNT (0) 296b, conducted to an output with data output signal lines 620–622, respectively. Data output signals ZEROCNT (1) 296a and ZEROCNT (0) 296b represent the number of leading zeros in 3 bit data input signal 246, when a one is present in the 3 bit data input signal 246. The 4 bit COUNTER-DETECTOR 216 also provides a single bit data output signal, GTZERO 295, conducted to the output by data output signal line 624. Data output signal, GTZERO 295, represents the presence and absence of a one in the data input signal 246. Output 624 conducts detector output signal GTZERO 295.

GTZERO 295 has two states where the first state represents the presence of a one in the data input signal 246 and a second state that represents the absence of a one in the data input signal 246. If GTZERO 295 equals one (first state), one of the 3 bits received by the 4 bit COUNTER-DETECTOR 300 in FIG. 3 equals one. If GTZERO 295 equals zero (second state), all 3 bits of the data input signal are zero. The 2 bit counter output signal and the one bit detector output signal indicate the number of leading zeros in the 3 bit data input signal 246.

MULTIPLEXER 224—STRUCTURE

Figure 7:
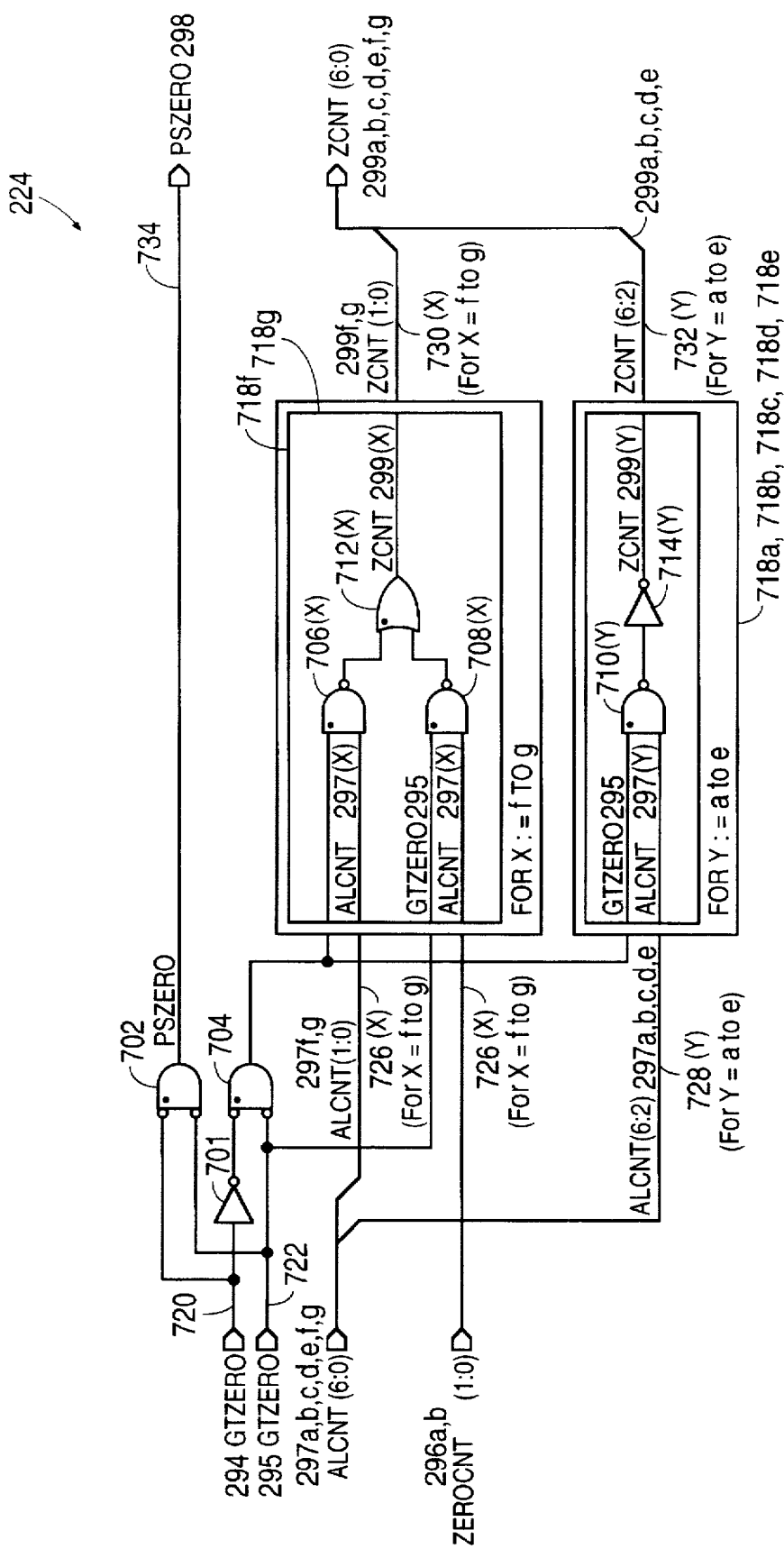
FIG. 7 illustrates a schematic diagram of a MULTIPLEXER employed by the 67 bit Leading Zero Indicator.

FIG. 7 illustrates the schematic diagram of MULTIPLEXER 224. As shown in FIG. 7, one implementation of MULTIPLEXER 224 appropriately connects INVERTER 701, NOR gates 702 and 704, data output signal lines, 734, 730(X), and 732(Y), and data input signal lines 720 and 722. MULTIPLEXER 224 is further implemented by connecting identical circuits 718a, 718b, 718c, 718d, and 718e to NOR gate 704, an output with data output signal lines 732(Y), and an input with data input signal lines 728(Y), for Y equal to "a to e". Additionally, MULTIPLEXER 224 is further implemented by connecting identical circuits 718f and 718g to NOR gate 704, an output with data output signal lines 730(X), an input with data input signal lines 724(X), and inputs 726(X) for X equal to "f to g". The implementations result in the multiplexer circuitry shown in FIG. 7.

In FIG. 7, circuits 718a, 718b, 718c, 718d, and 718e are represented schematically by a single circuit implemented by appropriately connecting NAND gate 710(Y) and INVERTER 714(Y). Note the legend "FOR Y=a to e " in the boxes surrounding circuits 718a, 718b, 718c, 718d, and 718e. The legend denotes that when "Y" is substituted with "a", circuit 718a is obtained, when "Y" is substituted with "b", circuit 718b is obtained, when "Y" is substituted with "c", circuit 718c is obtained, when "Y" is substituted with "d", circuit 718d is obtained, and when "Y" is substituted with "e", circuit 718e is obtained (note: the "(1:0)" has been omitted from the ZEROCNT 296(X) and the ALCNT 297 (Y) symbology within the boxes surrounding circuits 718a, 718b, 718c, 718d, and 718e, 718f, and 718g). In FIG. 7, circuits 718f and 718g are represented schematically by a single circuit implemented by appropriately connecting NAND gates 706(X) and 708(X) and NAND gate 712(X). Note the legend "FOR X=f to g" in the boxes surrounding circuits 718f and 718a. The legend denotes that when "X" is substituted with "f", circuit 718f is obtained and when "X" is substituted with "g", circuit 718g is obtained. Circuits 718a, 718b, 718c, 718d, and 718e provide the most significant bit through the fifth most significant bit, (ZCNT (6:2) 299a,b,c,d,e) respectively, of data output signal ZCNT (6:0) 299a,b,c,d,e,f,g. Circuits 718f and 718g provide the sixth most significant and least significant bits, (ZCNT (1:0) 299f,g) respectively, of data output signal ZCNT (6:0) 299a,b,c,d,e,f,g.

MULTIPLEXER 224—OPERATION

In operation, MULTIPLEXER 224 receives 4 data input signals. The data input signals are GTZERO 294, GTZERO 295, ZEROCNT (1:0) 296a, and ALCNT (6:0) 297a,b,c,d,e,f,g. An input with data input signal lines 720 and 722 conducts detector data input signals GTZERO 294 and GTZERO 295, respectively. ALCNT (6:0) 297a,b,c,d,e,f,g is segmented such that an input with data input signal lines 728(Y) and 724(X) conducts data input signals ALCNT (6:2) 297a,b,c,d,e (ALCNT 297(Y)) and ALCNT (1:0) 297f,g (ALCNT 297(X)), respectively. An input with data input signal lines 726(X) conducts data input signals ZEROCNT (1:0) 296a,b (ZEROCNT 296(X)), respectively. MULTIPLEXER 224 provides the 7 bit data output signal ZCNT (6:0) 299a,b,c,d,e,f,g and one bit data output signal PSZERO 298 indicating the number of leading zeros in the original 67 bit data input signal. An output with data signal output lines 732(Y) and 730(X) conducts data output signals ZCNT (6:2) 299a,b,c,d,e (ZCNT 299(Y)) and ZCNT (1:0) 299f,g (ZCNT 299(X)), respectively. An output with data output signal line 734 conducts data output signal PSZERO 298. Circuits 716a, 716b, 718a, 718b, 718c, 718d, and 718e allow ALCNT (6:0) 297a,b,c,d,e,f,g to communicate to the output of MULTIPLEXER 224 (represented by 7 bit data output signal ZCNT (6:0) 299a,b,c,d,e,f,g) if GTZERO 294 equals $1_2$ and GTZERO 295 equals $0_2$ which indicates there are no ones in the data input signal 246 of 4 bit COUNTER-DETECTOR 216. If a one is detected in 4 bit COUNTER-DETECTOR 216, as reflected by GTZERO 295 equal $0_2$, ZCNT (6:0) 299a,b,c,d,e,f,g will equal the number of zeros in the data input signal 246 of 4 bit COUNTER-DETECTOR 216 which equals the number of leading zeros in the three most significant bits of 67 bit data input signal 230. If all 67 bits of input signal 230 are zero, indicated by GTZERO 294 equals $0_2$ and GTZERO 295 equals $0_2$, then a single bit data output signal PSZERO 298 of MULTIPLEXER 224 equals one and ZCNT (6:0) 299a,b,c,d,e,f,g equals $0000000_2$ which indicates that all 67 bits of input signal 230 are zero. PSZERO 298 equals zero if there is a one present in any of the 67 bits of the original 67 bit data input signal 230. GTZERO 294 and GTZERO 295 are instrumental in allowing MULTIPLEXER 224 to select the correct output to indicate the number of leading zeros in the 67 bit data input signal 230.

67 BIT LEADING BIT INDICATOR—EXAMPLE

The following is an example illustrating an embodiment of the 67 bit leading bit indicator. It will be assumed for this example that each bit of 67 bit data input signal 230 is capable of possessing two possible values denoted as ones and zeros. It will be further assumed that leading zeros are to be determined, therefore, zeros are denoted here as "count bits" and ones are "non-count bits." Using a 67 bit data input signal 230 of 000 (group A), 00000000 (group B), 00000000 (group C), 00000000 (group D), 00000010 (group E), 11110000 (group F), 00101011 (group G), 00000000 (group H), 00000001 (group J) (spaces and group labels have been provided for clarity), the 67 data input signal bits are applied sequentially to COUNTER-DETECTORS 216–201, respectively. The 4 bit COUNTER-DETECTOR 216 receives data input signal 246 which contains the three most significant bits, 000 (group A). The most significant 8 bit COUNTER-DETECTOR 214 receives data input signal 244 which contains the most significant group of 8 bits, 00000000 (group B). The second most significant 8 bit COUNTER-DETECTOR 212 receives data input signal 242 which contains the second most significant group of 8 bits, 00000000 (group C). The third most significant 8 bit COUNTER-DETECTOR 210 receives data input signal 240 which contains the third most significant group of 8 bits, 00000000 (group D). The fourth most significant 8 bit COUNTER-DETECTOR 208 receives data input signal 238 which contains the fourth most significant group of 8 bits, 00000010 (group E). The fifth most significant 8 bit COUNTER-DETECTOR 206 receives data input signal 236 which contains the fifth most significant group of 8 bits, 11110000 (group F). The sixth most significant 8 bit COUNTER-DETECTOR 201 receives data input signal 234 which contains the sixth most significant group of 8 bits, 00101011 (group G). The seventh most significant 8 bit COUNTER-DETECTOR 204 receives data input signal 232 which contains the seventh most significant group of 8 bits, 00000000 (group H). The least significant 8 bit COUNTER-DETECTOR 202 receives data input signal 231 which contains the least significant group of 8 bits, 00000001 (group J).

The 4 bit COUNTER-DETECTOR 216 will have counter output signals ZEROCNT (1:0) $296a,b=10_2$ i.e. ZEROCNT (1) $296a=1_2$ and ZEROCNT (0) $296b=0_2$ and detector output signal GTZERO 295 $=0_2$. The 8 bit COUNTER-DETECTOR 214 will have counter output signals ZEROCNT (2:0) $280a,b,c=111_2$, and detector output signal GTZERO $270=0_2$. The 8 bit COUNTER-DETECTOR 212 will have counter output signals ZEROCNT (2:0) $281a,b,c=111_2$ and detector output signal GTZERO $271=0_2$. The 8 bit COUNTER-DETECTOR 210 will have counter output signals ZEROCNT (2:0) $282a,b,c=111_2$ and detector output signal GTZERO 272 32 $0_2$. The 8 bit COUNTER-DETECTOR 208 will have counter output signals ZEROCNT (2:0) $283a,b,c=110_2$ and detector output signal GTZERO $273=1_2$. The 8 bit COUNTER-DETECTOR 208 is, therefore, the most significant 8 bit COUNTER-DETECTOR with a one in its 8 bit data input signal, i.e. the most significant non-count group. The 3 bits represented by ZEROCNT (2:0) also indicate the location of the first non-count bit or one i.e. the seventh position. The 8 bit COUNTER-DETECTOR 206 will have counter output signals ZEROCNT (2:0) $284a,b,c=000_2$ and detector output signal GTZERO $274=1_2$. The 8 bit COUNTER-DETECTOR 204 will have counter output signals ZEROCNT (2:0) $285a,b,c=111_2$ and detector output signal GTZERO $274=0_2$. The 8 bit COUNTER-DETECTOR 202 will have counter output signals ZEROCNT (2:0) $286a,b,c=111_2$ and detector output signal GTZERO 276 32 $0_2$. The 8 bit COUNTER-DETECTOR 201 will have counter output signals ZEROCNT (2:0) $287a,b,c=111_2$ and detector output signal GTZERO $277=1_2$.

GTZERO 270–277 is received sequentially by 8 bit COUNTER-DETECTOR 218. The 8 bit COUNTER-DETECTOR 218 will have counter output signals ZEROCNT (2:0) $292a,b,c=011_2$, which represents the number of most significant count groups, and detector output signal GTZERO $294=1_2$. DECODER 220 receives the outputs of 8 bit COUNTER-DETECTORS 214–201 and communicates ZEROCNT (2:0) $283a,b,c$ to an output as data output signal ZEROCNT (2:0) $290a,b,c=110_2$ because 8 bit COUNTER-DETECTOR 208 is the most significant 8 bit COUNTER-DETECTOR to contain a one in its 8 bit data input signal.

ADDER-CONCATENATOR 222 concatenates ZEROCNT (2:0) $292a,b,c=011_2$ with ZEROCNT (2:0) $290a,b,c=110_2$ to form a 6 bit concatenation $011110_2$ and then adds $11_2$ so that ADDERCONCATENATOR'S 222 output ALCNT (6:0) $297a,b,c,d,e,f,g=0100001_2$ is the concatenation plus the number of bits in excess of the least significant 64 bits. MULTIPLEXER 224 receives data input signals GTZERO $294=1_2$, GTZERO $295=0_2$, ZEROCNT (1:0) $296a,b,=11_2$, and ALCNT (6:0)$=0100001_2$. Because GTZERO 294 equaled $1_2$, PSZERO 298 equals $0_2$. Because GTZERO $294=1_2$ and GTZERO $295=0_2$, MULTIPLEXER 224 provides 7 bit data output signal ZCNT (6:0) $299a,b,c,d,e,f,g=0100001_2$ which equals the number of leading zeros in the original 67 bit data input signal 230.

64 BIT LEADING ZERO INDICATOR

Figure 8A:
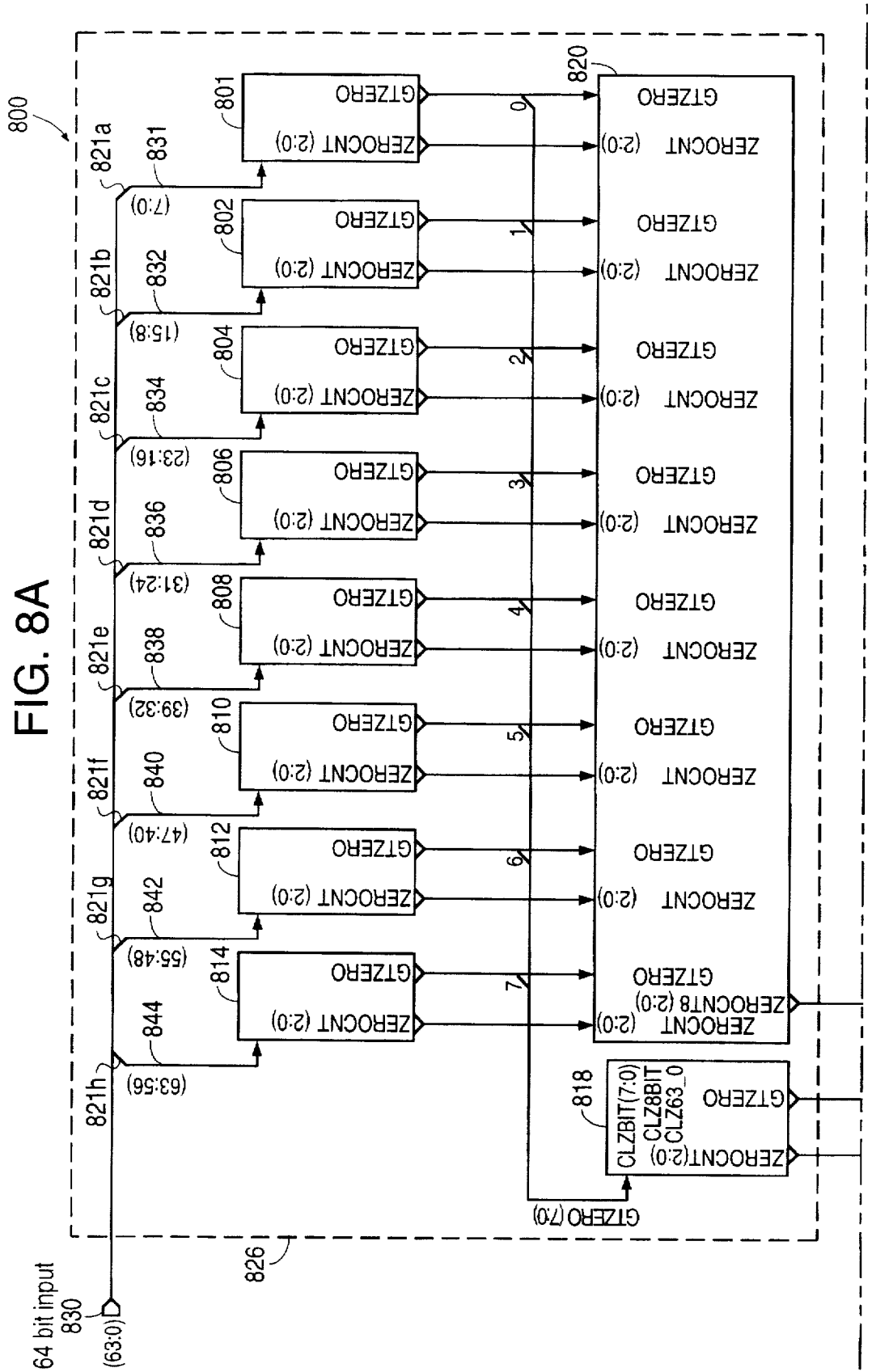
FIG. 8 illustrates a schematic diagram of a 64 bit Leading Zero Indicator.
Figure 8B:
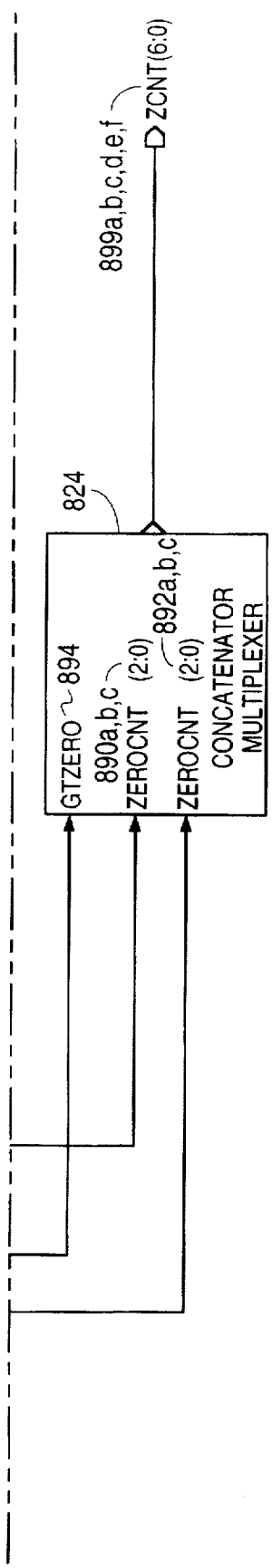

FIG. 8 illustrates a block diagram of a 64 bit Leading Zero Indicator 800. The 64 bit Leading Zero Indicator 800 is designed to determine the number of leading zeros in a 64 bit data input signal 830 received in parallel and consists of counter circuit 826 and CONCATENATOR-MULTIPLEXER 824. Counter circuit 826 is identical to counter circuit 226. The difference between the 64 bit Leading Zero Indicator of FIG. 8 and the 67 bit Leading Zero Indicator of FIG. 2 is that the 4 bit COUNTER-DETECTOR 216 is not needed and ADDER-CONCATENATOR 222 and MULTIPLEXER 224 are replaced by CONCATENATOR-MULTIPLEXER 824.

CONCATENATOR-MULTIPLEXER 824 includes an input with input data signal lines 914, 916(X), and 918(Y) for receiving three data input signals, GTZERO 894, ZEROCNT (2:0) $890e,f,g$ and ZEROCNT (2:0) $892b,c,d$. GTZERO 894 is a single bit detector data input signal from 8 bit COUNTER-DETECTOR 818 representing the presence or absence of a one in 8 bit COUNTER-DETECTOR 818's data input signal. ZEROCNT (2:0) $890e,f,g$ is a 3 bit counter data input signal from DECODER 820 representing the number of leading zeros in the most significant 8 bit COUNTER-DETECTOR in FIG. 8 to contain a one in its data input signal. ZEROCNT (2:0) $892b,c,d$ is a 3 bit data input signal from 8 bit COUNTER-DETECTOR 818 representing the number of 8 bit groups of zeros contained in the 64 bit data input signal 830 before a one is detected. CONCATENATOR-MULTIPLEXER 824 provides a seven bit data output signal ZCNT (6:0) 899a,b,c,d,e,f representing the number of leading zeros in the original 64 bit data input signal.

CONCATENATOR-MULTIPLEXER 824— STRUCTURE

Figure 9:
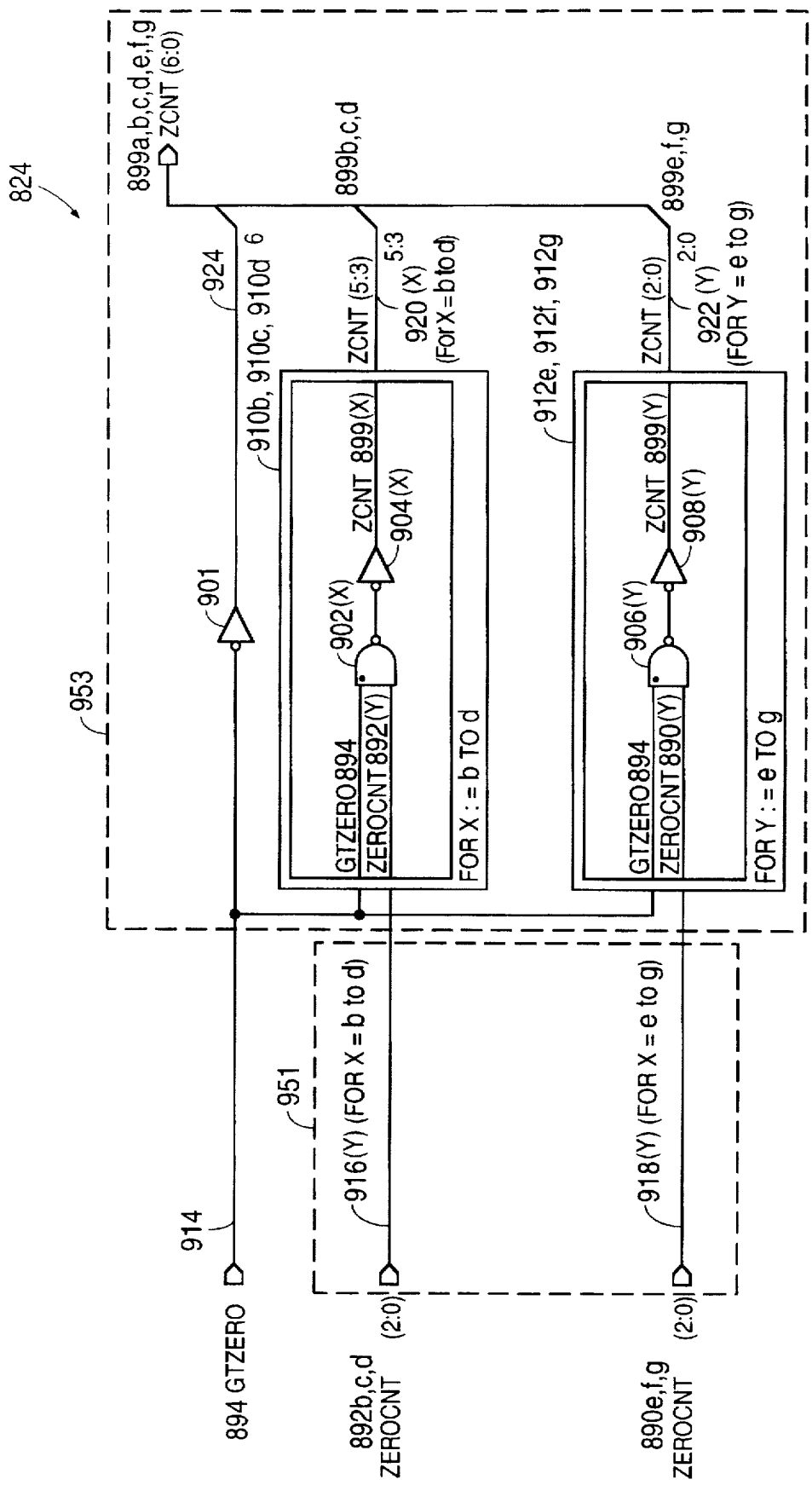
FIG. 9 illustrates a schematic diagram of a CONCATENATOR-MULTIPLEXER employed by the 64 bit Leading Zero Indicator.

FIG. 9 illustrates the schematic diagram of CONCATENATOR-MULTIPLEXER 824 constituting concatenator-multiplexer circuitry. One implementation of CONCATENATOR-MULTIPLEXER 824 connects INVERTER 901, identical circuits 910b, 910c, and 910d, an input with data input signal line 914, an output with data output signal line 924, and identical circuits 912e, 912f, and 912g as shown in FIG. 9. CONCATENATOR-MULTIPLEXER 824 is further implemented by appropriately connecting circuits 910b, 910c, and 910d to data input signal line 914, the input with data input signal lines 916(X), and the output with data output signal lines 920(X) as shown in FIG. 9. Data input signal line 914 conducts detector data input signal GTZERO 894, and data input signal lines 916(X) conduct data input signal ZEROCNT (2:0) 892b,c,d, data output signal lines 920(X) conduct data output signal ZCNT (5:3) 899b,c,d. Additionally, CONCATENATOR-MULTIPLEXER 824 is further implemented by appropriately connecting circuits 912e, 912f, and 912g to data input signal line 914, the input with data input signal lines 918(Y), and the output with data output signal lines 922(Y) as shown in FIG. 9. Data input signal lines 918(Y) conduct data input signal ZEROCNT (2:0) 890e,f,g, and data output signal lines 922(Y) conduct data output signal ZCNT (2:0) 899e,f,g.

In FIG. 9, circuits 910b, 910c, and 910d are represented schematically by a single circuit implemented by appropriately connecting NAND gates 902(X) and INVERTERS 904(X). Note the legend "FOR Y=b to d" in the boxes surrounding circuits 910b, 910c, and 910d. The legend denotes that when "Y" is substituted with "b", circuit 910b is obtained, when "Y" is substituted with "c", circuit 910c is obtained, and when "Y" is substituted with "d", circuit 910d is obtained (note: the "(2:0)" has been omitted from the ZEROCNT 892(Y) symbology within the boxes surrounding circuits 910b, 910c, and 910d). One suitable implementation of circuits 912e, 912f, and 912g appropriately connects NAND gates 906(Y) and INVERTERS 908(Y) as shown in FIG. 9. Note the legend "FOR Y=e to g" in the boxes surrounding circuits 912e, 912f, and 912g. The legend denotes that when "Y" is substituted with "e", circuit 912e is obtained, when "Y" is substituted with "f", circuit 912f is obtained, and when "Y" is substituted with "g", circuit 912g is obtained (note: the "(2:0)" has been omitted from the ZEROCNT 890(Y) symbology within the boxes surrounding circuits 912e, 912f, and 912g). INVERTER 901 provides the most significant bit, ZCNT (6) 899a, of data output signal ZCNT (6:0) 899a,b,c,d,e,f,g. Circuits 910b, 910c and 910d provide the second, third, and fourth most significant bits, (ZCNT (5:3) 899b,c,d) respectively, of data output signal ZCNT (6:0) 899a,b,c,d,e,f,g. Circuits 912e, 912f, and 912g provide the fifth, sixth, and least most significant bits, (ZCNT (2:0) 899e,f,g) respectively, of data output signal ZCNT (6:0) 899a,b,c,d,e,f,g. Concatenator-multiplexer 824 may be divided into concatenator circuitry 951 and multiplexer circuitry 953.

CONCATENATOR-MULTIPLEXER 824— OPERATION

In operation, CONCATENATOR-MULTIPLEXER 824 performs the function of concatenating data signals ZEROCNT (2:0) 892b,c,d and ZEROCNT (2:0) 890e,f,g with concatenator circuitry 951 and selecting the output correctly representing the number of leading zeros in the 64 bit data input signal 830. Concatenator circuitry 951 concatenates data output signals ZEROCNT (2:0) 892a,b,c and ZEROCNT (2:0) 890a,b,c by taking the two sets of three signal lines conducting data output signals ZEROCNT (2:0) 292a,b,c and ZEROCNT (2:0) 290a,b,c and combining them into one group of six signal lines 916(X) and 918(Y). CONCATENATOR-MULTIPLEXER 824 receives data input signals GTZERO 894, ZEROCNT 892b,c,d and ZEROCNT 890e,f,g and provides an output signal, ZCNT (6:0) 899a,b,c,d,e,f,g, indicating the number of leading zeros in the 64 bit data input signal 830. If GTZERO 894 is a zero, indicating that the original 64 bit data input signal 830 contained all zeros, inverter 901 provides a data output signal ZCNT(6) 899a=$1_2$ and circuits 910b, 910c, and 910d provide data output signals ZCNT(5) 899b=$0_2$, ZCNT(4) 899c=$0_2$, and ZCNT(3) 899d=$0_2$. Also, circuits 912e, 912f, and 912g provide data output signals ZCNT(2) 899e=$0_2$, ZCNT(1) 899f=$0_2$, and ZCNT(0) 899g=$0_2$ i.e. ZCNT (6:0) 899a,b,c,d,e,f,g equals $1000000_2$. If GTZERO 894 is a one, then ZCNT (6) 899a is a zero and CONCATENATOR-MULTIPLEXER 824 concatenates ZEROCNT (2:0) 892b,c,d to ZEROCNT (2:0) 890e,f,g. As a result, CONCATENATOR-MULTIPLEXER'S 824 output ZCNT (6) 899a equals $0_2$ followed by the result of the concatenation. Therefore, on the basis of GTZERO 894, CONCATENATOR-MULTIPLEXER 824 selects whether data output signal ZCNT (6:0) 899a,b,c,d,e,f,g represents the concatenation or $1000000_2$, which represents the number of bits in the 64 bit input signal and indicates that all bits of the 64 bit data input signal 830 equaled zero. Therefore, if the 64 bit data input signal 830 contains a $1_2$, i.e. a non-count bit for a leading zero indicator, the concatenation represents the number of leading zeros in the 64 bit data input signal 830. For example, if GTZERO 894=$1_2$, ZEROCNT (2:0) 892b,c,d=$010_2$, and ZEROCNT (2:0) 890e,f,g=$110_2$, the concatenation of ZEROCNT (2:0) 892b,c,d and ZEROCNT (2:0) 890e,f,g=$010110_2$, and data output signal ZCNT (6:0) 899a,b,c,d,e,f,g=$0010110_2$. The data output signal ZCNT (6:0) 899a,b,c,d,e,f,g equals the number of leading zeros in the original 64 bit data input signal 830.

The aforementioned embodiments are just some of the many possible embodiments. For example, a 128 bit Leading Zero Indicator could be obtained by duplicating the 64 bit Leading Zero Indicator 800 with the exception of the CONCATENATOR-MULTIPLEXER 824. A modified CONCATENATOR-MULTIPLEXER 824 would be provided that would be capable of receiving signals representing the number of the most significant groups of 8 bits containing all zeros in both the most significant group of 64 bits and the least significant group of 64 bits. Likewise, the modified CONCATENATOR-MULTIPLEXER 824 could provide an output representing the number of leading zeros in the most significant group of 64 bits. If the most significant group of 64 bits did not contain a one, then the modified CONCATENATOR-MULTIPLEXER 824 could provide an output representing the number of leading zeros in the least significant group of 64 bits. Otherwise if all 128 bits were zeros, then the modified CONCATENATOR-MULTIPLEXER 824 could provide an output representing all 128 bits.

In a modification of the foregoing, four of the 8 bit COUNTER-DETECTORS of FIG. 8 are removed and the DECODER is modified to conduct a reduced number of data input signals proportional to the decrease in the number of 8 bit COUNTER-DETECTORS. In a further modification to determine a number leading zeros in a 32 bit data input signal each of the 8 bit COUNTER-DETECTORS 801–814 is replaced with 4 bit COUNTER-DETECTORS. The 4 bit COUNTER-DETECTORS would provide 2 bit outputs representing the number of leading zeros in their data input signal if a one is present. Also, the MULTIPLEXER 824 would be modified to concatenate a 2 bit from the DECODER 820 with the data input signal from a 4 bit COUNTER-DETECTOR that determined a number of the most significant groups of 4 bits containing all zeros preceding the most significant group containing a one. If the 32 bit data input signal contained all zeros, the modified MULTIPLEXER 824 would provide an output representing a 32 bit number.

It will be appreciated that described herein are generally the apparatus and method for determining a number of digits leading a particular digit ("leading digit indicator"). A leading digit indicator pertains to a device used to determine a number of particular count digits in a data signal that lead or precede a non-count digit. Each digit has a value, represented by a zero, one, two, three, four, or any other nomenclature. The values may each represent a specific voltage level such as 0 Volts, 3 Volts, 5 Volts, or any other useful voltage level. It may be desirable to determine a number of leading count digits in a data input signal with R plus X groups of M digits. Each digit would represent either a count digit or a non-count digit. A count digit is a digit whose value it is desirable to count. A non-count digit is a digit whose value it is not desirable to count. Leading count digits are the most significant digits in a data input signal, having any number of digits, that precede (or are more significant than) the most significant non-count digit. The data input signal may be segmented into R most significant digits and a remainder of X groups of M bits where each digit may be represented by any of N possible values. The N possible values may be count values and non-count values. The number of leading count digits in the X groups of M digits may be indicated by concatenating the number of most significant groups of M digits to the number of leading count digits in the most significant group of M digits with a non-count digit. The number of leading count digits in the most significant group of M digits with a non-count digit is represented by Z digits where $M=N^Z$ (R, X, M, and Z are non-negative integers). The number of leading count digits in the entire data signal may be indicated by the number of leading count digits in the R most significant digits or in the concatenation plus R if the R most significant digits contain only count digits.

Therefore, the methods and apparatus described herein generally may be used to determine the number of leading count digits (or bits in a binary digit system). For example, each bit may have up to two values represented, for example, by ones and zeros, or each digit may have up to three values represented, for example, by twos, ones, and zeros, in a data input signal containing any number of values. For example, assume that a 32 digit data input signal with each digit represented by one of three possible values can be represented by 0001 (group A) 111110000 (group B) 010102011 (group C) 010120011 (group D). The 32 digit data input signal may be divided, as above, into the 4 most significant digits (group A) with a remainder of 3 groups of 9 digits (groups B, C, and D) i.e. Q equals 32, X equals 3, M equals 9, N equals 3, and R equals 4. Assuming that "2" is the non-count value, the number of leading count digits in the most significant group of 9 digits containing a non-count value (group C), is $12_3$ (i.e. $5^{10}$) which notably is represented by two digits (i.e. $9=3^{(Z=number\ of\ digits)}$). The number of most significant groups of 9 digits preceding group C is $1_3$ (group B). Concatenating, results in $112_3$ (i.e. $14_{10}$) which represents the number of leading count values in groups B, C, and D. Because R is non-zero and does not contain a non-count value, R is added to the concatenation to obtain $200_3$ (i.e. $18_{10}$). Therefore, the number of leading count values in the 32 digit example equals $200_3$.

It may be apparent that many other modifications are possible without departing from the scope of the present invention as set forth in the appended claims.

What is claimed is:

1. A computer system comprising:
   a concatenator to receive first data representing a number of leading count digits in a most significant non-count group of M digits in a data input signal, the most significant non-count group being a most significant group of X groups of M digits in the data input signal having a non-count digit, to receive second data representing a number of most significant groups of the X groups of M digits preceding the most significant non-count group, and to concatenate the first and second data to indicate a number of leading count digits in the X groups of M digits, wherein X and M are non-negative integers.

2. The computer system as in claim 1 wherein each of the M digits has one of N possible values, wherein N is a non-negative integer.

3. The computer system as in claim 2 wherein the first data is represented by Z digits and $M=N^Z$.

4. The computer system as in claim 2 wherein X equals eight, M equals eight, N equals two, and Z equals three.

5. The computer system as in claim 1 wherein the data input signal further comprises R most significant digits, the computer system further comprising:
   an adder to add R to the concatenation of the first and second data to indicate a number of leading count digits in the R plus X times M digits if the R digits do not contain a non-count digit.

6. The computer system as in claim 5 further comprising:
   a multiplexer to receive the concatentation of the first and second data plus R, to receive third data representing a number of leading count digits, if any, in the R most significant digits, to receive fourth data indicating whether the R most significant digits include a non-count digit, to select the concatentation of the first and second data plus R to indicate a number of leading count digits in the data input signal if the fourth data indicates an absence of a non-count digit in the R most significant digits, and to select the third data to indicate a number of leading count digits in the data input signal if the fourth data indicates a presence of a non-count digit in the R most significant digits.

7. The computer system as in claim 1 wherein the count digits are zeros and the non-count digit is a one.

8. The computer system as in claim 1 further comprising:
   X counter-detectors to each receive a respective group of M digits, to count a number of leading count digits, if any, in the respective group of M digits, and to detect a non-count digit, if any, in the respective group of M digits.

9. The computer system as in claim 8 further comprising:
   a decoder to receive the number of leading count digits, if any, from each of the X counter-detectors and to provide the first data to the concatenator from a most significant of the X counter-detectors to detect a non-count digit.

10. The computer system as in claim 8 further comprising:

a counter-detector to count a number of most significant X counter-detectors to detect a non-count digit and to provide the second data to the concatenator.

11. A computer system comprising:

means for receiving a data signal having X groups of M bits;

means for counting a number of leading zeros, if any, in each of the respective groups of M bits;

means for receiving the number of leading zeros in a most significant group of M bits having a one;

means for counting a number of most significant groups of M bits to include only zeros that precede the most significant group of Mbits having a one;

means for receiving the number of most significant groups of M bits to include only zeros; and means for concatenating the number of most significant groups of M bits to include only zeros to the number of leading zeros in the most significant group of M bits having a one to indicate a number of leading zeros in the X groups of M bits, wherein X and M are non-negative integers.

12. The computer system as in claim 11 wherein the data input signal further comprises R most significant bits, the computer system further comprising:

means to add R to a concatenation of the number of most significant groups of M bits to include only zeros to the number of leading zeros in the most significant group of M bits having a one to indicate a number of leading zeros in the R plus X times M bits of the data signal if the R bits contain only zeros.

13. The computer system as in claim 12 further comprising:

means for deter mining whether the R most significant bits include a one;

means for determining a number of leading zeros preceding a one, if any, in the R most significant bits;

means for selecting the concatentation of the number of most significant groups of M bits to include only zeros to the number of leading zeros in the most significant group of M bits having a one plus R if the R most significant bits have only zeros; and means for selecting the number of leading zeros preceding the one if the R most significant bits include a one.

14. The computer system as in claim 12 wherein the number of leading zeros in the most significant group of M bits having a one is represented by Z bits and $M=2^Z$.

15. A method of determining a number of leading count digits in an input data signal, the method comprising the steps of:

receiving first data representing a number of leading count digits in a most significant non-count group of M digits in the data input signal, the most significant non-count group being a most significant group of X groups of M digits in the data input signal having a non-count digit, wherein each of the M digits has one of N possible values, N is a non-negative integer, the first data is represented by Z digits, and $M=N^Z$;

receiving second data representing a number of most significant groups of the X groups of M digits preceding the most significant non-count group of M digits ; and concatenating the first and second data to indicate a number of leading count digits in the X groups of M digits, wherein X and M are non-negative integers.

16. The method as in claim 15 wherein the data input signal further comprises R most significant digits, the method further comprising the step:

adding R to the concatenation of the first and second data to indicate a number of leading count digits in the R plus X times M digits if the R digits do not contain a non-count digit.

17. The method as in claim 16 further comprising the steps of:

receiving third data representing a number of leading count digits, if any, in the R most significant digits;

receiving fourth data indicating whether the R most significant digits include a non-count digit, selecting a concatentation of the first and second data plus R to indicate a number of leading count digits in the data input signal if the fourth data indicates an absence of a non-count digit in the R most significant digits; and selecting the third data if the fourth data indicates a presence of a non-count digit in the A most significant digits.

18. The method as in claim 16 wherein the first data is represented by Z digits and $M=N^Z$ and N equals three.

19. The method as in claim 15 further comprising the step of:

performing the steps in claim 15 in a floating point unit of a computer system.

20. The method as in claim 15 further comprising the steps of:

determining a number of leading count digits, if any, in each of the respective groups of M digits;

determining the presence and absence of a non-count digit in each of the X groups of M digits; and determining the number of most significant groups of the X groups of M digits preceding the most significant non-count group of M digits using a determined presence and absence of a non-count digit in each of the X groups of M digits.

* * * * *

UNITED STATES PATENT AND TRADEMARK OFFICE
CERTIFICATE OF CORRECTION

PATENT NO. : 5,798,953
ISSUE DATE : August 25, 1998
INVENTOR(S) : Lozano, Leonel It is certified that error appears in the above-identified patent and that said Letters Patent is hereby corrected as shown below:

Column 5, line 28; after "1993", please insert --now abandoned--, *and*
Column 20, line 34; please delete "*A*" and insert --*R*--.

Signed and Sealed this

Fourteenth Day of September, 1999

Attest:

Q. TODD DICKINSON

*Attesting Officer*      *Acting Commissioner of Patents and Trademarks*